US012555375B2

(12) United States Patent
Wu et al.

(10) Patent No.: US 12,555,375 B2
(45) Date of Patent: Feb. 17, 2026

(54) TEMPORAL ACTION LOCALIZATION WITH MUTUAL TASK GUIDANCE

(71) Applicant: International Business Machines Corporation, Armonk, NY (US)

(72) Inventors: Bo Wu, Cambridge, MA (US); Chuang Gan, Cambridge, MA (US); Pin-Yu Chen, White Plains, NY (US); Yang Zhang, Cambridge, MA (US); Xin Zhang, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 645 days.

(21) Appl. No.: 17/875,566

(22) Filed: Jul. 28, 2022

(65) Prior Publication Data
US 2024/0037940 A1  Feb. 1, 2024

(51) Int. Cl.
*G06K 9/00* (2022.01)
*G06V 10/82* (2022.01)
(Continued)

(52) U.S. Cl.
CPC ............. *G06V 20/41* (2022.01); *G06V 10/82* (2022.01); *G06V 20/46* (2022.01); *G06V 20/49* (2022.01); *G06V 40/20* (2022.01)

(58) Field of Classification Search
None
See application file for complete search history.

(56) References Cited

U.S. PATENT DOCUMENTS 10,210,391 B1 *  2/2019  Jones .................... G06V 20/40
10,242,266 B2 *  3/2019  Jones ..................... G06N 3/08
(Continued)

FOREIGN PATENT DOCUMENTS

CN  108805083 A  * 11/2018  .......... G06F 18/214
CN  110362715 A  * 10/2019  .......... G06F 16/783
(Continued)

OTHER PUBLICATIONS

CN-108805083-A (machine translation) (Year: 2018).*
(Continued)

*Primary Examiner* — Feng Niu
(74) *Attorney, Agent, or Firm* — CHIP LAW GROUP

(57) ABSTRACT

A computer vision temporal action localization (TAL) computing tool and operations are provided. The TAL computing tool receives a coarse temporal bounding box, having a first start point and a first end point, for an action in the input video data, and a first set of logits, where each logit corresponds to a potential classification of the action in the input video data. The TAL computing tool executes a first engine on the coarse temporal bounding box to generate a second set of logits, and a second engine on the first set of logits to generate a refined temporal bounding box having a second start point and a second end point. The TAL computing tool performs the computer vision temporal action localization operation based on the second set of logits and the refined temporal bounding box to specify a temporal segment of the input video data corresponding to an action represented in the input video data, and a corresponding classification of the action represented in the temporal segment.

20 Claims, 6 Drawing Sheets

(51) Int. Cl.
    *G06V 20/40*     (2022.01)
    *G06V 40/20*     (2022.01)

(56) References Cited

U.S. PATENT DOCUMENTS

| | | | | |
|---|---|---|---|---|
| 10,445,582 | B2* | 10/2019 | Mehrseresht | G06V 20/49 |
| 10,565,454 | B2* | 2/2020 | Mehrseresht | G06T 7/248 |
| 10,726,313 | B2* | 7/2020 | Lee | G06N 3/08 |
| 10,740,620 | B2* | 8/2020 | Vijayanarasimhan | G06V 20/30 |
| 10,776,628 | B2 | 9/2020 | Escorcia et al. | |
| 10,839,009 | B2* | 11/2020 | Chen | G06F 16/783 |
| 10,839,223 | B1* | 11/2020 | Jiang | G06V 20/46 |
| 10,860,859 | B2* | 12/2020 | Yang | G06F 18/217 |
| 10,902,289 | B2* | 1/2021 | Gao | G06V 10/809 |
| 11,158,351 | B1* | 10/2021 | Ren | G11B 27/28 |
| 11,232,308 | B2* | 1/2022 | Gao | G06N 3/084 |
| 11,361,451 | B2* | 6/2022 | Papari | G06T 7/277 |
| 11,393,209 | B2* | 7/2022 | Vijayanarasimhan | G06N 3/0464 |
| 11,468,676 | B2* | 10/2022 | Rawat | G06V 20/41 |
| 11,776,269 | B2* | 10/2023 | Carreira | G06V 20/40 382/190 |
| 11,842,541 | B1* | 12/2023 | Carvalho | G06V 40/28 |
| 11,902,548 | B2* | 2/2024 | Sridhar | G06N 3/082 |
| 11,935,296 | B2* | 3/2024 | Moon | G06V 20/44 |
| 12,125,279 | B1* | 10/2024 | Carvalho | G06N 3/04 |
| 12,211,274 | B2* | 1/2025 | Ma | G06V 20/49 |
| 12,423,975 | B2* | 9/2025 | Liu | G06V 20/46 |
| 2017/0177943 | A1* | 6/2017 | Mehrseresht | G06V 10/85 |
| 2017/0255832 | A1* | 9/2017 | Jones | G06V 10/454 |
| 2018/0173955 | A1* | 6/2018 | Mehrseresht | G06F 18/24137 |
| 2018/0246963 | A1* | 8/2018 | Chen | G06F 16/783 |
| 2019/0042850 | A1* | 2/2019 | Jones | G06V 20/40 |
| 2019/0102908 | A1* | 4/2019 | Yang | G06V 10/82 |
| 2019/0163978 | A1* | 5/2019 | Yang | G06F 18/217 |
| 2019/0325275 | A1* | 10/2019 | Lee | G06V 30/19167 |
| 2019/0362507 | A1* | 11/2019 | Papari | G06T 5/20 |
| 2020/0160064 | A1* | 5/2020 | Wang | G06V 10/82 |
| 2020/0175281 | A1 | 6/2020 | Gan et al. | |
| 2020/0302178 | A1* | 9/2020 | Gao | G06N 3/044 |
| 2020/0302236 | A1* | 9/2020 | Gao | G06F 18/2415 |
| 2020/0364464 | A1* | 11/2020 | Vijayanarasimhan | G06V 20/30 |
| 2021/0124987 | A1* | 4/2021 | Gan | G06F 18/24147 |
| 2021/0248377 | A1* | 8/2021 | Huang | G06N 3/08 |
| 2022/0019807 | A1 | 1/2022 | Carreira et al. | |
| 2022/0067382 | A1* | 3/2022 | Moon | G06V 20/49 |
| 2022/0164580 | A1* | 5/2022 | Moura | G06V 20/41 |
| 2022/0222940 | A1* | 7/2022 | Rawat | G06V 20/40 |
| 2022/0303560 | A1* | 9/2022 | Sridhar | G06N 3/082 |
| 2022/0327834 | A1* | 10/2022 | Liu | G06V 10/82 |
| 2022/0335718 | A1* | 10/2022 | Ma | G06V 20/70 |
| 2024/0054757 | A1* | 2/2024 | Guo | G06V 20/41 |
| 2024/0404279 | A1* | 12/2024 | Mittal | G06V 10/82 |
| 2025/0054339 | A1* | 2/2025 | Stephen | G06V 10/764 |

FOREIGN PATENT DOCUMENTS

| | | | |
|---|---|---|---|
| CN | 110427807 | A | 11/2019 |
| CN | 111401205 | A | 7/2020 |
| CN | 112257579 | A | 1/2021 |
| CN | 113378656 | A | 9/2021 |
| CN | 113420598 | A | 9/2021 |
| WO | WO-2021184852 | A1 * | 9/2021 ............ G06V 20/46 |
| WO | WO2021/204143 | A1 | 10/2021 |

OTHER PUBLICATIONS

CN-110362715-A (machine translation) (Year: 2019).*
WO-2021184852-A1 (machine translation) (Year: 2021).*
Rahman et al., "Single-Stage End-to-End Temporal Activity Detection in Untrimmed Videos," 2020 17th Conference on Computer and Robot Vision (CRV), Ottawa, ON, Canada, 2020, pp. 206-213 (Year: 2020).*
He et al., "Bi-direction feature pyramid temporal action detection network." In Asian Conference on Pattern Recognition, pp. 889-901. Cham: Springer International Publishing, 2019. (Year: 2019).*
Lê et al., "Mutual guidance meets supervised contrastive learning: Vehicle detection in remote sensing images." Remote Sensing 14, No. 15 (2022): 3689. (Aug. 1, 2022) (Year: 2022).*
Xia et al., "A Survey on Temporal Action Localization," in IEEE Access, vol. 8, pp. 70477-70487, 2020 (Year: 2020).*
Li et al., "Cfad: Coarse-to-fine action detector for spatiotemporal action localization." In European Conference on Computer Vision, pp. 510-527. Cham: Springer International Publishing, 2020. (Year: 2020).*
Liu et al., "Completeness Modeling and Context Separation for Weakly Supervised Temporal Action Localization," 2019 IEEE/CVF Conference on Computer Vision and Pattern Recognition (CVPR), Long Beach, CA, USA, 2019, pp. 1298-1307 (Year: 2019).*
Huang et al., "Spatial-Temporal Context-Aware Online Action Detection and Prediction," in IEEE Transactions on Circuits and Systems for Video Technology, vol. 30, No. 8, pp. 2650-2662, Aug. 2020 (Year: 2020).*
Liu et al., "Weakly Supervised Temporal Action Localization Through Contrast Based Evaluation Networks," 2019 IEEE/CVF International Conference on Computer Vision (ICCV), Seoul, Korea (South), 2019, pp. 3898-3907 (Year: 2019).*
Sharir et al., "Action in chains: A chains model for action localization and classification," IEEE Winter Conference on Applications of Computer Vision, Steamboat Springs, CO, USA, 2014, pp. 610-617 (Year: 2014).*
Li et al., "A joint model for action localization and classification in untrimmed video with visual attention," 2017 IEEE International Conference on Multimedia and Expo (ICME), Hong Kong, China, 2017, pp. 619-624 (Year: 2017).*
Dai et al., "Temporal Context Network for Activity Localization in Videos," 2017 IEEE International Conference on Computer Vision (ICCV), Venice, Italy, 2017, pp. 5727-5736 (Year: 2017).*
Vahdani et al., "Deep Learning-Based Action Detection in Untrimmed Videos: A Survey," in IEEE Transactions on Pattern Analysis and Machine Intelligence, vol. 45, No. 4, pp. 4302-4320, Apr. 1, 2023 (arXiv in 2021) (Year: 2021).*
Khursheed, S. Khalid, F. Riaz and T. Shehryar, "A Review of Activity Detection Methods Used in Videos Streaming," 2023 International Conference on Robotics and Automation in Industry (ICRAI), Peshawar, Pakistan, 2023, pp. 1-4 (Year: 2023).*
Su et al., "Cascaded Pyramid Mining Network for Weakly Supervised Temporal Action Localization." arXiv preprint arXiv: 1810.11794 (2018). (Year: 2018).*
Chen et al., "Watch Only Once: An End-to-End Video Action Detection Framework," 2021 IEEE/CVF International Conference on Computer Vision (ICCV), Montreal, QC, Canada, 2021, pp. 8158-8167 (Year: 2021).*
Degiorgio et al., "Spatio-Temporal Action Localization in a Weakly Supervised Setting." arXiv preprint arXiv:1905.02171 (2019). (Year: 2019).*
Nathania et al., "Deep Learning Based Spatiotemporal Human Action Recognition and Localization System," 2021 8th International Conference on Advanced Informatics: Concepts, Theory and Applications (ICAICTA), Bandung, Indonesia, 2021, pp. 1-6 (Year: 2021).*
Kong et al., "BLP—Boundary Likelihood Pinpointing Networks for Accurate Temporal Action Localization," ICASSP 2019—2019 IEEE International Conference on Acoustics, Speech and Signal Processing (ICASSP), Brighton, UK, 2019, pp. 1647-1651, doi: 10.1109/ICASSP.2019.8682466. (Year: 2019).*
Spyros Gidaris and Nikos Komodakis, "Locnet: Improving localization accuracy for object detection," in Proceedings of the IEEE Conference on Computer Vision and Pattern Recognition, 2016, pp. 789-798 (Year: 2016).*

(56) References Cited

OTHER PUBLICATIONS

Tianwei Lin, Xu Zhao, Haisheng Su, Chongjing Wang, and Ming Yang, "Bsn: Boundary sensitive network for temporal action proposal generation," in European Conference on Computer Vision, 2018. (Year: 2018).*

Xu, Huijuan, Ximeng Sun, Eric Tzeng, Abir Das, Kate Saenko, and Trevor Darrell. "Revisiting few-shot activity detection with class similarity control." arXiv preprint arXiv:2004.00137 (2020). (Year: 2020).*

Ju et al., "Divide and Conquer for Single-frame Temporal Action Localization," 2021 IEEE/CVF International Conference on Computer Vision (ICCV), Montreal, QC, Canada, 2021, pp. 13435-13444 (Year: 2021).*

Soomro et al., "Online Localization and Prediction of Actions and Interactions," in IEEE Transactions on Pattern Analysis and Machine Intelligence, vol. 41, No. 2, pp. 459-472, Feb. 1, 2019 (Year: 2019).*

Tran et al., "An Effective Temporal Localization Method with Multi-View 3D Action Recognition for Untrimmed Naturalistic Driving Videos," 2022 IEEE/CVF Conference on Computer Vision and Pattern Recognition Workshops (CVPRW), New Orleans, LA, USA, 2022, pp. 3167-3172 (Year: 2022).*

Wikipedia, "Logit", Jul. 11, 2022 (Year: 2022).*

Wikipedia, "Logistic regression", Jul. 27, 2022 (Year: 2022).*

Bello, Irwan et al., "Attention Augmented Convolutional Networks", 2019 IEEE/CVF International Conference on Computer Vision, ICCV 2019, Seoul, Korea (South), Oct. 27-Nov. 2, 2019, 10 pages.

Buch, Shyamal et al., "End-to-End, Single-Stream Temporal Action Detection in Untrimmed Videos", BMVC 2017 Proceedings of the British Machine Vision Conference 2017, Sep. 2017, 12 pages.

Buch, Shyamal et al., "SST: Single-Stream Temporal Action Proposals", 2017 IEEE International Conference on Computer Vision (ICCV), Oct. 2017, 10 pages.

Carreira, Joao et al., "Quo Vadis, Action Recognition? A New Model and the Kinetics Dataset", 2017 IEEE Conference on Computer Vision and Pattern Recognition (CVPR), Jul. 2017, 10 pages.

Chao, Yu-Wei et al., "Rethinking the Faster R-CNN Architecture for Temporal Action Localization", arXiv:1804.07667v1 [cs.CV] Apr. 20, 2018, 13 pages.

Chen, Bo et al., "Escalation: A Framework for Efficient and Scalable Spatio-temporal Action Localization", MMSys 21, Sep. 28-Oct. 1, 2021, Istanbul, Turkey, 13 pages.

Chen, Peihao et al., "RSPNet: Relative Speed Perception for Unsupervised Video Representation Learning", The Thirty-Fifth AAAI Conference on Artificial Intelligence (AAAI-21), Feb. 2021, 9 pages.

Escorcia, Victor et al., "DAPs: Deep Action Proposals for Action Understanding", 2016 IEEE Conference on Computer Vision and Pattern Recognition (CVPR), Jun. 2016, 17 pages.

Gaidon, Adrien et al., "Temporal Localization of Actions with Actoms", https://hal.inria.fr/hal-00804627/file/ASM_TPAMI_Gaidon.pdf, Submitted on Mar. 26, 2013, 15 pages.

Gao, Jiyang et al., "Cascaded Boundary Regression for Temporal Action Detection", arXiv:1705.01180v1 [cs.CV] May 2, 2017, 11 pages.

Gao, Yuan et al., "NDDR-CNN: Layerwise Feature Fusing in Multi-Task CNNs by Neural Discriminative Dimensionality Reduction", IEEE Conference on Computer Vision and Pattern Recognition, CVPR 2019, Long Beach, CA, USA, Jun. 16-20, 2019, 11 pages.

Gao, Jiyang et al., "TURN TAP: Temporal Unit Regression Network for Temporal Action Proposals", 2017 IEEE International Conference on Computer Vision (ICCV), Oct. 22-29, 2017, 9 pages.

Heilbron, Fabian C. et al., "Fast Temporal Activity Proposals for Efficient Detection of Human Actions in Untrimmed Videos", 2016 IEEE Conference on Computer Vision and Pattern Recognition (CVPR), Jun. 2016, 10 pages.

Heilbron, Fabian C. et al., "SCC: Semantic Context Cascade for Efficient Action Detection", 2017 IEEE International Conference on Computer Vision (ICCV), Oct. 2017, 10 pages.

Huang, Yupan et al., "Decoupling Localization and Classification in Single Shot Temporal Action Detection", 2019 IEEE International Conference on Multimedia and Expo (ICME) (2019): Jul. 2019, 6 pages.

Kahatapitiya, Kumara et al., "Coarse-Fine Networks for Temporal Activity Detection in Videos", Conference on Computer Vision and Pattern Recognition, CVPR 2021, virtual, Jun. 19-25, 2021, 10 pages.

Kaiming, He et al., "MASK R-CNN", IEEE International Conference on Computer Vision, ICCV 2017, Venice, Italy, Oct. 22-29, 2017, 12 pages.

Kim, Dahun et al., "Self-Supervised Video Representation Learning with Space-Time Cubic Puzzles", The Thirty-Third AAAI Conference on Artificial Intelligence (AAAI-19), Jan. 2019, 8 pages.

Kopuklu, Okan et al., "You Only Watch Once: A Unified CNN Architecture for Real-Time Spatiotemporal Action Localization", Preprint submitted to Journal of LATEX Templates Oct. 19, 2021, 32 pages.

Lee, Wonhee et al., "Multi-task Self-supervised Object Detection via Recycling of Bounding Box Annotations", IEEE Conference on Computer Vision and Pattern Recognition, CVPR 2019, Long Beach, CA, USA, Jun. 16-20, 2019, 10 pages.

Li, Zhihui et al., "Three Birds with One Stone: Multi-Task Temporal Action Detection via Recycling Temporal Annotations", IEEE Conference on Computer Vision and Pattern Recognition, CVPR, 2021, virtual, Jun. 19-25, 2021, 10 pages.

Lin, Tianwei et al., "BMN: Boundary-Matching Network for Temporal Action Proposal Generation", 2019 IEEE/CVF Conference on Computer Vision and Pattern Recognition (CVPR), Jun. 2019, 10 pages.

Lin, Chuming et al., "Learning Salient Boundary Feature for Anchor-free Temporal Action Localization", 2021 IEEE/CVF Conference on Computer Vision and Pattern Recognition. Jun. 2021, 10 pages.

Lin, Tianwei et al., "Single Shot Temporal Action Detection", arXiv:1710.06236v1 [cs.CV] Oct. 17, 2017, 9 pages.

Liu, Shikun et al., "End-to-End Multi-Task Learning with Attention", IEEE Conference on Computer Vision and Pattern Recognition, CVPR 2019, Long Beach, CA, USA, Jun. 16-20, 2019, 10 pages.

Liu, Yuan et al., "Multi-granularity Generator for Temporal Action Proposal", 2019 IEEE/CVF Conference on Computer Vision and Pattern Recognition (CVPR), Jun. 2019, 10 pages.

Liu, Qinying et al., "Progressive Boundary Refinement Network for Temporal Action Detection", The Thirty-Fourth AAAI Conference on Artificial Intelligence (AAAI-20), Feb. 2020, 8 pages.

Liu, Kun et al., "T-C3D: Temporal Convolutional 3D Network for Real-Time Action Recognition", The Thirty-Second AAAI Conference on Artificial Intelligence (AAAI-18), Feb. 2018, 8 pages.

Long, Fuchen, "Gaussian Temporal Awareness Networks for Action Localization", 2019 IEEE/CVF Conference on Computer Vision and Pattern Recognition (CVPR), Jun. 2019, 10 pages.

Misra, Ishan et al., "Cross-stitch Networks for Multi-task Learning", 2016 IEEE Conference on Computer Vision and Pattern Recognition, CVPR 2016, Jun. 27-30, 2016, 10 pages.

Nguyen, Thien H. et al., "Graph Convolutional Networks with Argument-Aware Pooling for Event Detection", The Thirty-Second AAAI Conference on Artificial Intelligence (AAAI-18), Feb. 2018, 8 pages.

Parmer, Niki et al., "Image Transformer", Proceedings of the 35th International Conference on Machine Learning, ICML 2018, Stockholmsmässan, Stockholm, Sweden, Jul. 10-15, 2018, 10 pages.

Piergiovanni, A.J., "Temporal Gaussian Mixture Layer for Videos", Proceedings of the 36th International Conference on Machine Learning, Long Beach, California, Jun. 2019, 10 pages.

Qing, Zhiwu et al., "Temporal Context Aggregation Network for Temporal Action Proposal Refinement", Conference on Computer Vision and Pattern Recognition, CVPR 2021, virtual, Jun. 19-25, 2021, 10 pages.

(56) References Cited

OTHER PUBLICATIONS

Qiu, Zhaofan et al., "Learning Spatio-Temporal Representation with Local and Global Diffusion", 2019 IEEE/CVF Conference on Computer Vision and Pattern Recognition (CVPR), Jun. 2019, 10 pages.

Ramaswamy, Akshaya et al., "Spatio-temporal action detection and localization using a hierarchical LSTM", 2020 IEEE/CVF Conference on Computer Vision and Pattern Recognition Workshops (CVPRW), Jun. 2020, 10 pages.

Shou, Zheng et al., "CDC: Convolutional-De-Convolutional Networks for Precise Temporal Action Localization in Untrimmed Videos", 2017 IEEE International Conference on Computer Vision (ICCV), Oct. 2017, 10 pages.

Shou, Zheng et al., "Temporal Action Localization in Untrimmed Videos via Multi-stage CNNs", 2016 IEEE Conference on Computer Vision and Pattern Recognition (CVPR), Jun. 2016, 10 pages.

Singh, Gurkirt et al., "Untrimmed Video Classification for Activity Detection: submission to ActivityNet Challenge", arXiv:1607.01979v2 [cs.CV] Jul. 12, 2016, 4 pages.

Tran, Du et al., "Learning Spatiotemporal Features with 3D Convolutional Networks", 2015 IEEE International Conference on Computer Vision (ICCV), Dec. 2015, 9 pages.

Vandenhende, Simon et al., "MTI-Net: Multi-Scale Task Interaction Networks for Multi-Task Learning", Computer Vision—ECCV 2020—16th European Conference, Glasgow, UK, Aug. 23-28, 2020, 22 pages.

Vaswani, Ashish et al., "Attention Is All You Need", Advances in Neural Information Processing Systems 30: Annual Conference on Neural Information Processing Systems 2017, Dec. 4-9, 2017, 11 pages.

Wei, Zijun, "Sequence-to-Segments Networks for Detecting Segments in Videos", IEEE Transactions on Pattern Analysis and Machine Intelligence (vol. 43, Issue: 3, Mar. 1, 2021), 13 pages.

Weinzaepfel, Philippe et al., "Learning to track for spatio-temporal action localization", arXiv:1506.01929v2 [cs.CV] Sep. 27, 2015, 9 pages.

Wu, Bo et al., "STAR: A Benchmark for Situated Reasoning in Real-World Videos", Thirty-fifth Conference on Neural Information Processing Systems (NeurIPS), Dec. 2021, 13 pages.

Xu, Wanru et al., "Action recognition and localization with spatial and temporal contexts", Neurocomputing, v. 333, pp. 351-363, DOI:10.1016/j.neucom.2019.01.008, first published online Jan. 9, 2019, 13 pages.

Xu, Dan et al., "PAD-Net: Multi-Tasks Guided Prediction-and-Distillation Network for Simultaneous Depth Estimation and Scene Parsing", 2018 IEEE Conference on Computer Vision and Pattern Recognition, CVPR 2018, Salt Lake City, UT, USA, Jun. 18-22, 2018, 10 pages.

Xu, Huijuan et al., "R-C3D: Region Convolutional 3D Network for Temporal Activity Detection", 2017 IEEE International Conference on Computer Vision (ICCV), Oct. 2017, 10 pages.

Yang, Le et al., "Revisiting Anchor Mechanisms for Temporal Action Localization", arXiv:2008.09837v1 [cs.CV] Aug. 22, 2020, 13 pages.

Yeung, Serena et al., "End-to-end Learning of Action Detection from Frame Glimpses in Videos", 2016 IEEE Conference on Computer Vision and Pattern Recognition (CVPR), Jun. 2016, 10 pages.

Zeng, Runhao et al., "Graph Convolutional Module for Temporal Action Localization in Videos", Journal of Latex Class Files, vol. 14, No. 8, Aug. 2015, 13 pages.

Zeng, Runhao et al., "Graph Convolutional Networks for Temporal Action Localization", 2019 IEEE/CVF Conference on Computer Vision and Pattern Recognition (CVPR), Jun. 2019, 10 pages.

Zhang, Zhenyu et al., "Joint Task-Recursive Learning for Semantic Segmentation and Depth Estimation", Computer Vision—ECCV 2018—15th European Conference, Sep. 8-14, 2018, 17 pages.

Zhang, Heng, "Localize to Classify and Classify to Localize: Mutual Guidance in Object Detection", Computer Vision—ACCV 2020—15th Asian Conference on Computer Vision, Nov. 30-Dec. 4, 2020, 15 pages.

Zhang, Zhenyu et al., "Pattern-Affinitive Propagation across Depth, Surface Normal and Semantic Segmentation", IEEE Conference on Computer Vision and Pattern Recognition, CVPR 2019, Long Beach, CA, USA, Jun. 16-20, 2019.

Zhao, Peisen et al., "Bottom-Up Temporal Action Localization with Mutual Regularization", arXiv:2002.07358v3 [cs.CV] Feb. 2, 2602, 17 pages.

Zhao, Yue et al., "Temporal Action Detection with Structured Segment Networks", 2017 IEEE International Conference on Computer Vision (ICCV), Oct. 2017, 10 pages.

Zhao, Chen et al., "Video Self-Stitching Graph Network for Temporal Action Localization", 2021 IEEE/CVF Conference on Computer Vision and Pattern Recognition (CVPR), Jun. 2021, 10 pages.

Zhu, Zixin et al., "Enriching Local and Global Contexts for Temporal Action Localization", 2021 IEEE/CVF Conference on Computer Vision and Pattern Recognition (CVPR), Jun. 2021, 10 pages.

Aguilar Nelson "7 Search Tips You Need to Know to Find Specific Photos & Videos Faster on Your iPhone", iOS & iPhone, Apr. 15, 2021, 05 pages, https://ios.gadgethacks.com/how-to/7-search-tips-you-need-know-find-specific-photos-videos-faster-your-iphone-0324534/.

Evans Lisa "The Best Video Surveillance System for Your Home", Nov. 9, 2016, 04 pages, http://reliable-remodeler.com/the-best-video-surveillance-system-for-your-home/.

\* cited by examiner

TEMPORAL ACTION LOCALIZATION WITH MUTUAL TASK GUIDANCE

BACKGROUND

The present application relates generally to an improved data processing apparatus and method and more specifically to improved computing tools and computing tool operations and functionality with regard to temporal action localization in video/image sequence data using mutual task guidance mechanisms.

Computer vision is a field of artificial intelligence (AI) that enables computers and systems to derive meaningful information from digital images, videos, and other visual inputs and then take actions or make recommendations based on that information. If AI enables computers to think, then computer vision enables them to see, observe, and understand.

Where human vision has the advantage of lifetimes of context to train how to tell objects apart, how far away they are, whether they are moving, and where there is something wrong in an image, computers and computer vision AI mechanism do not have this context. Thus, computer vision field often involves training machines, and specifically machine learning computer models, to perform computer functions that emulate human vision but with the use of cameras, data, and algorithms rather than retinas, optic nerves, and a visual cortex. As computing systems are able to process data more quickly than the human brain, such computer vision AI mechanisms may quickly surpass human capabilities.

Computer vision AI mechanisms are increasingly being used in various industries ranging from energy and utilities to manufacturing and automotive computer systems, to security and surveillance computer systems. For example, computer vision AI mechanisms are used in collision avoidance systems on many modern vehicles. Computer vision AI mechanisms are also used in security and surveillance computer systems for identifying individuals, e.g., performing facial recognition, and/or identifying situations that warrant a response from security personnel. There are a plethora of applications of computer vision AI and these applications are growing.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided that performs a computer vision temporal action localization operation on input video data. The method comprises receiving a coarse temporal bounding box, having a first start point and a first end point, for an action in the input video data, and a first set of logits. Each logit corresponds to a potential classification of the action in the input video data. The method further comprises executing a first engine on the coarse temporal bounding box to generate a second set of logits and executing a second engine on the first set of logits to generate a refined temporal bounding box having a second start point and a second end point. In addition, the method comprises performing the computer vision temporal action localization operation based on the second set of logits and the refined temporal bounding box to specify a temporal segment of the input video data corresponding to an action represented in the input video data, and a corresponding classification of the action represented in the temporal segment.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1A:
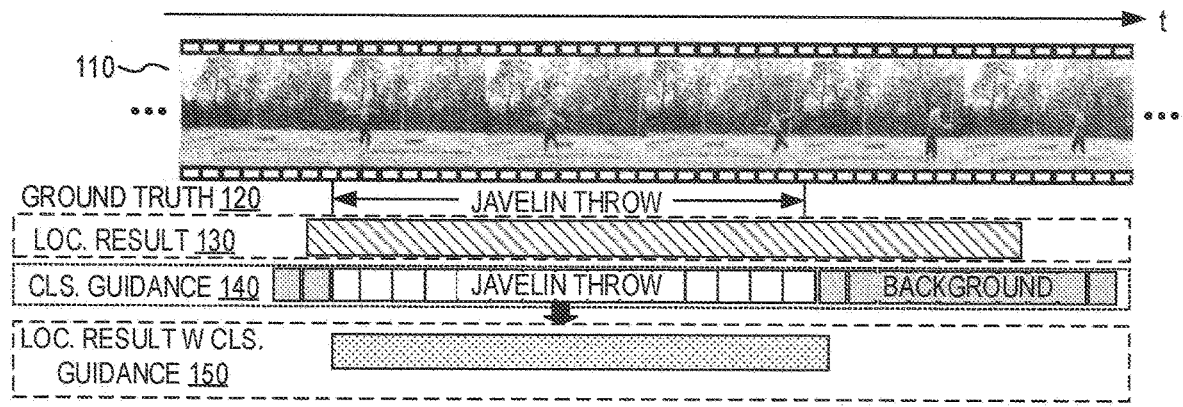
FIG. 1A is an example diagram showing a portion of video content for demonstrating issues with regard to localization of actions as part of a temporal action localization operation.

As noted above, computer vision artificial intelligence (AI) tools are increasingly important in various industries and applications to assist human beings with a number of different situations and operations. Computer vision AI tools take video/image data as input, such as that captured by cameras and converted to data representations of the image/sequence of images observed, and, depending on the particular computer vision AI tools being employed, can perform various operations including object detection and classification, action detection, action classification, and the like. These operations are increasingly important as the amount of image/video data is spread and stored in modern computing systems and AI operations increasingly operate on such image/video data to provide a computer understanding of what is represented in these images/video such that meaningful insights may be generated by these AI operations for various applications.

One operation that a computer vision AI tool may perform is temporal action localization (TAL). TAL refers to a computer operation or functionality to identify the temporal boundaries in a sequence of images or frames (also referred to as video) in received data and categorize the action instances of interest in untrimmed video data. It should be appreciated that herein, references to images, frames, video, or the like, are considered to be referencing the data structures comprising the data representations of these images, frames, video, and the like, as the invention is specifically to an improved computing tool and improved computing tool operations/functionality that operates on such data structures in a manner that cannot be practically performed as a mental process or as any organization of human activity. Moreover, the terms "image" and "frame" may be used interchangeably to refer to a data representation of a captured image at a particular instance in time, with a video being a sequence of such images/frames over a time period comprising a plurality of instances in time.

TAL is a challenging but important task in computer visual comprehension, i.e., providing the computer vision AI tool with an understanding of what actions are being performed, when such actions are being performed, and by which actors within the input video data so that additional computer functionality based on this computer understanding is able to be performed. That is, in order for a computer vision AI tool to know what computer functionality to implement based on a video input, the computer vision AI tool needs to know not only what the actors/object are in the input video, but what actions are being performed, and when these actions are being performed in the sequence of images/frames of the video data input. TAL can provide such information so as to facilitate further AI operations, such as video analysis, video surveillance, and action retrieval, e.g., specifying an action of interest and retrieving segments of video data that depict the action of interest.

TAL operations performed by computer vision AI tools comprise two primary subtasks, i.e., localization and classification. The localization subtask aims to localize the temporal boundaries of action instances without differentiating categories of the actions. The localization subtask identifies start and end times for segments of the video input, i.e., sequences of frames, in which an action is determined to be present, thereby defining a predicting bounding box for corresponding action instances. The classification subtask aims to identify the categories of the action instances, i.e., classify actions present in the input video. These subtasks are performed independent of one another as two separate subtasks such that the categorization of the action instances has no bearing on the results generated by the localization subtask, or vice versa.

That is, TAL operations of computer vision AI tools, in some approaches, may use a two-stage methodology for analyzing the video data input. With such a two-stage approach, in a first stage, the localization subtask is performed to generate proposals. In the second stage, the classification subtask is performed on each proposal to extract features within the proposals generated in the first stage and perform classification with the extracted features. The TAL operations perform the two subtasks subsequently and independently, as the localization does not take into consideration any action classification and the action classification, other than being directed to the proposals, is otherwise not affected by the localization subtask results. This provides a solution that implements learning in two separate and independent stages instead of as an end-to-end solution, resulting in more complex training and action detection processes. To simplify the training and action detection processes, a single stage methodology that performs the two subtasks with two parallel branches may be provided, however such a one-stage approach still implements the separate and independent parallel branches and produces numerous negative samples and yields inferior performance compared to the two-stage approach.

Because of this separate and independent performance of the localization and classification subtasks, the computer vision models used to perform the localization subtask are not able to accurately determine what content is relevant/irrelevant to the localization of the actions, resulting in the predicted bounding boxes of the actions present in the input video including irrelevant segments (or frames), i.e., frames in which the action is not actually present. Stated another way, the computer vision models may fail to specify the contents of actions and predict imprecise boundary boxes for such actions. Moreover, because the classification subtask is performed independent of the localization subtask, the classification of actions without consideration of the temporal scope of the actions may make it difficult for the computer vision models involved to specify the range of the content to be recognized and thus, is vulnerable to interference by irrelevant segments, i.e., frames in which the action to be classified is not actually present or in which other content is present that may cause the classification to generate incorrect results.

For example, as shown in FIG. 1A, a portion of video content 110 is shown in which frames of the video over a period of time "t" show a human athlete performing an action of throwing a javelin along with related actions such as picking up the javelin and walking after the javelin throw. Below the video content 110 are shown the ground truth 120, i.e., the actual specification of the temporal range, having a start temporal point and end temporal point defining a temporal range, of an action of interest having a classification of "javelin throw." In addition, below the ground truth is a showing of the localization result 130 generated by computer vision models in a two-stage TAL operation, and classification result 140 generated by the computer vision models in a two-stage TAL operation. Finally, element 150 shows a result generated by the mechanisms of the illustrative embodiments, which will be described in greater detail hereafter, and which utilize a localization with classification guidance and classification with localization guidance that provides an improved computing tool and improved computing tool operation that generates more accurate results, relative to the ground truth 120, than the two-stage TAL operation.

As shown in FIG. 1A, the computer vision models may locate, and generate localization result 130, for the javelin throw action without category information and predict a boundary box containing segments about irrelevant human behaviors. That is, as shown, the localization result 130 includes frames outside the temporal range shown in the ground truth 120, such as frames that include an athlete taking a javelin and walking back after the javelin throw action ends. Moreover, by performing the classification task without temporal scope information, the model may not specify the range of content to be classified, making it vulnerable to interference from irrelevant content, such as the background content. While in some cases this classification may get the classification correct, in other cases, such classification may be incorrect, such as shown in FIG. 1B.

Figure 1B:
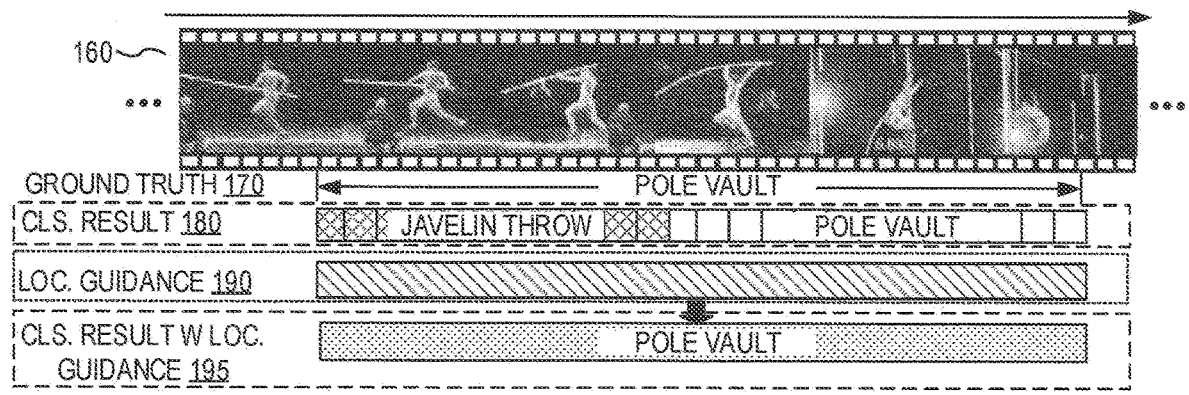
FIG. 1B is an example diagram showing a portion of video content for demonstrating issues with regard to action classification as part of a temporal action localization operation.

As shown in the bottom of FIG. 1B, for a video data input 160 showing a human athlete performing a pole vault, the computer vision models may perform classification without knowing the temporal scope to be classified, and only observe the earlier part of the pole vault. While the ground truth correctly shows this portion to be a pole vault, it is easy for a computer vision model to confuse a pole vault action with a javelin throw action because they share a similar content, i.e., an athlete running with a pole. As a result, the computer vision model may generate an incorrect classification result 180 that the first portion of the video sequence has a "javelin throw" classification, even though the localization result 190 may have a relatively correct temporal range. Again, as shown in FIG. 1B, as will be described in greater detail hereafter, the mechanisms of the illustrative embodiments utilize localization with classification guidance, and classification with localization guidance, to generate accurate results 195 relative to the ground truth 120, 170.

Observing the results shown in FIGS. 1A and 1B, it is noted that when locating and recognizing the actions appearing in video data input, the information contained in the results of one subtask can be used to help generate more accurate results in the other subtask, and vice versa. That is, when the temporal boundaries, e.g., temporal start point and temporal end point, of actions are being localized, knowing the categories or classifications of the actions of interest can be used to more accurately distinguish between segments that are associated with the actions, and other segments that are irrelevant to those actions. For example, in the example shown in FIG. 1A, if the action category label of "javelin throw" is introduced, i.e., specified as the action of interest, the content relevant to the javelin throw may be identified and irrelevant segments about an athlete walking back with a javelin may be excluded.

As for classification, if the temporal scope is known, the category of the action appearing within the temporal scope may be identified more accurately. For example, with the example in FIG. 1B, if the temporal scope of the actions is known, the entire temporal region from the temporal start point to the temporal end point may be used to perform the classification of the action which would allow distinguishing between the javelin throw action and a pole vault action. That is, the erroneous classification result 180 is generated because the classification of the first portion is done without any specific temporal range being specified for the action classification and the computer vision model evaluates sequences of frames in sequence such that once a satisfactorily high probability of a classification is generated, the corresponding classification label is associated with the video portion, e.g., javelin throw being associated with a first portion of the video content and then pole vault being associated with a second portion of video content. By including temporal scope information into the classification subtask, the classification operations performed by the computer vision model may be informed to not stop at the first portion of the sequence of frames when performing classification but instead to evaluate the entirety of the sequence of frames to generate the classification result.

To address the issues that arise specifically in computer vision AI tools and specifically because of the independent localization and classification subtasks of temporal action localization (TAL), the illustrative embodiments provide an improved computing tool and improved computing tool operations that use mutual guidance from the results of the two subtasks to enhance the output of each subtask, i.e., localization and classification. Contrary to the two-step TAL operations described previously, the illustrative embodiments utilize action classifications of interest as a mechanism to inform the temporal scope, or boundary box, determination. In addition, contrary to the two-step TAL operations described previously, the illustrative embodiments use a local attention mechanism to help the classification features adaptively aggregate information within the predicted boundary boxes, whereas the classification subtask of the two-step TAL operation only gathers information through a simple max pooling or average pooling operation.

The mutual guidance based mechanism and operation of the illustrative embodiments uses mutual guidance learning to mine the complementary information contained in both the outputs of the localization and classification to boost the performance without the requirement of additional pretext tasks. This mutual guidance approach takes into consideration the different data forms and information obtained from the localization and classification TAL subtasks.

That is, since the localization and classification operations differ significantly in both data form and information expressed, it is difficult to determine how to exploit the results of these subtasks help refine the outputs of each other. That is, while multi-task learning may be utilized with TAL operations to boost performance, such multi-task learning approaches simply fuse intermediate results into one feature through concatenation or addition and then use the fused feature to enhance the output. However, simply adding or concatenating results is inefficient and fails to adequately capture the relationships and complementary information between individual tasks. More importantly, the localization results of a first TAL subtask and the classification results of a second TAL subtask have different data forms and express different information, making it infeasible to simply fuse the results by concatenation or summing them up.

The illustrative embodiments provide a Mutual Task Guidance Module (MTGM) comprising two primary dual engines, i.e., a localization to classification attention (Loc2Cls) engine and a Classification to Localization Enhancement (Cls2Loc) engine, with cross data flows during mutual guidance machine learning. This pair of reverse engines directly transform and enhance the directional complementary information from one to the other, which is an architecture and functionality that has not been previously provided in any known systems or the two-stage TAL mechanisms or parallel branch based learning mechanisms mentioned above. The mutual guidance machine learning and specific architecture of the illustrative embodiments provides improved accuracy over known systems with regard to the ground truth when performing TAL operations on video data input, as is demonstrated in the illustrations of FIGS. 1A and 1B above (see elements 150 and 195).

In the MTGM of the illustrative embodiments, the localization results expressed by the localization subtask are used to express the temporal scope of the action, while the classification represents semantic information about the action. How to exploit these two widely different results to help refine the outputs of each other is a challenging problem. The MTGM solves this problem with the two engines Loc2Cls and Cls2Loc. The Loc2CLs engine exploits the localization results to guide the computer vision models to focus on meaningful moments, reducing the interference from irrelevant content. The Loc2Cls engine leverages the localization predictions to constrain the classification such that the classification operation attends to the features inside the entirety of the corresponding predicted box with a local attention mechanism. By dynamically aggregating the information within the entire predicted boxes, the output features can be used to predict more reliable classification results. The Cls2Loc engine takes advantage of the semantic information contained in the classification results to further refine localization predictions. First the classification features are extracted from the classification subtask results to encode semantic information, and then these features are combined with visual features to refine localization outputs. Finally, the two engines Loc2CLS and Cls2Loc are integrated to enhance the output of the computer vision model and improve the performance of temporal action location (TAL) operations of the computer vision model.

The illustrative embodiments provide an improved computing tool and improved computing tool operations that are the first to exploit mutual guidance of both the localization and classification subtasks of the TAL operation to enhance the outputs of these two subtasks and to improved the computer vision model operations as a result. The improved computing tool and improved computing tool operations of the illustrative embodiments are the first to leverage complementary information contained in the localization and classification subtasks through a mutual task guidance module (MTGM) composed of a Loc2Cls engine and a Cls2Loc engine, with this MTGM being configured and architecturally designed for integration into existing computer vision models to boost performance based on improved temporal action location. Existing computing systems, while able to perform a TAL operation, do so with significant reduction in accuracy as they cannot take into consideration the mutual guidance of the localization and classification subtasks. Thus, the improved computing tool and improved computing tool operations are specifically directed to improvements over existing technological processes.

Moreover, even if a human being were able to achieve a result that appears similar to the result generated by the mechanisms of the illustrative embodiments, such a result would be achieved through different subjective means requiring human intuition and experience. The improved computer mechanisms and improved computer operations/functionality of the illustrative embodiments is significantly different than any previous processes that may have been used by human beings to achieve similar results.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," as used herein with regard to describing embodiments and features of the invention, is not intended to be limiting of any particular technological implementation for accomplishing and/or performing the actions, steps, processes, etc., attributable to and/or performed by the engine, but is limited in that the "engine" is implemented in computer technology and its actions, steps, processes, etc. are not performed as mental processes or performed through manual effort, even if the engine may work in conjunction with manual input or may provide output intended for manual or mental consumption. The engine is implemented as one or more of software executing on hardware, dedicated hardware, and/or firmware, or any combination thereof, that is specifically configured to perform the specified functions. The hardware may include, but is not limited to, use of a processor in combination with appropriate software loaded or stored in a machine readable memory, and executed by the processor to thereby specifically configure the processor for a specialized purpose that comprises one or more of the functions of one or more embodiments of the present invention. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As described above, the illustrative embodiments of the present invention are specifically directed to an improved computing tool that automatically, given video input data, performs a temporal action localization operation on the video input data to identify one or more actions of interest present in the video input data so as to localize and classify the actions to thereby identify the temporal segments of the video input data, e.g., sequence of images/frames at corresponding time points, and their corresponding action classification labels. The temporal action location operation is performed with the aid of a mutual task guidance module (MTGM) that comprises a classification to localization enhancement (Cls2Loc) engine and Localization to Classification Attention (Loc2Cls) engine. The Loc2Cls engine uses the coarse bounding boxes of temporal sequences from an action localizer to guide the corresponding bounding box features to focus on within the bounding box to predict the enhanced classification results. The Cls2Loc engine uses a snippet-level classification result, predicted by an action classifier to provide category semantic information for the localization task and predict refined bounding boxes of temporal sequences corresponding to the classified actions. The results of these mutually guided and enhanced tasks are combined to provide a refined bounding box and corresponding refined action classification that provides a more accurate localization and classification of actions within video input data over existing computer vision systems.

All of the functions of the illustrative embodiments as described herein are intended to be performed using automated processes without human intervention. While a human being may be the subject of the imaging in the video input data, may initiate performance of operations by the improved computing tool of the illustrative embodiments, or may make use of the results generated by the mechanisms of the illustrative embodiments, the illustrative embodiments of the present invention themselves are not directed to actions performed by the human being, but rather logic and functions performed specifically by the improved computing tool on the video input data. Moreover, even though the present invention may provide an output that may be used by other computer vision system operations, or other computing systems performing various artificial intelligence specific operations, such as decision support systems, recommendation systems, intelligent alerting systems, and the like, and may generate outputs that may be presented to human beings to ultimately assist human beings in evaluating the content of the video input data specifically with regard to temporal action localization, the illustrative embodiments of the present invention are not directed to actions performed by the human being viewing the results of the processing performed by the MTGM system or computer vision system employing the MTGM system, but rather to the specific operations performed and mechanisms provided by the specific improved computing tool of the present invention which facilitate the processing by the MTGM or computer vision system in an improved manner and ultimately the generation of the results that assists other downstream computer vision system operations, artificial intelligence operations by other artificial intelligence computing systems, or human beings. Thus, the illustrative embodiments are not organizing any human activity, but are in fact directed to the automated logic and functionality of an improved computing tool.

The following discussion will first address a formulation of the problem of temporal action localization (TAL) in input video data that is addressed by the mechanisms of the illustrative embodiments. Again, this is a problem that is specific to computer vision processing of input video data and specifically to temporal action location in such input video data. This problem only exists in computing technology and the solution to this problem is provided by the illustrative embodiments also specifically in computer technology by providing an improved computing tool and improved computing tool having improved computer functionality to improve the accuracy of temporal action location used specifically by computer vision models. The mechanisms of the illustrative embodiments provide a different technological process from any previous human subjective determination based process using human thinking and intuition, and furthermore provides a level of accuracy not previously able to be achieved by existing computer TAL operations.

After formulating the problem, the following discussion will set forth the general methodology implemented in the improved computing tool and improved computing tool operations of the illustrative embodiments. Sections of the following description will detail the classification to localization enhancement (Cls2Loc) engine and localization to classification attention (Loc2Cls) engine mechanisms and operations, which again are specific improved computing tools and provide specific improved computing tool operations/functionality over existing systems. In addition, the following description will address the learning objectives and incorporation of the MTGM with other computer vision model elements to enhance computer vision model performance.

Problem Formulation

The improved computing tool of the illustrative embodiments provides improved computer functionality and an improved ordered combination of operations that enhance and improve computer executed temporal action localization (TAL) in computer vision systems. The improved computing tool and its corresponding improved computing tool operations operate on untrimmed video data V as input. The goal, or addressed problem, is to identify the action category label and the temporal boundary box for each action instance of interest in the video data, where the temporal boundary box comprises at least a temporal start point in the sequence of frames of the video data, and a temporal end point in the sequence of frames of the video data. Thus, the mechanisms of the illustrative embodiments may receive a set of action instances with N actions of interest that are to be identified as potentially occurring within video data inputs, where N is any number of actions of interest greater than zero. For example, the particular computer vision system may be interested in actions of "running", "jumping", "pole vaulting", "javelin throw," etc. In a security application, actions such as "opening door" or "walking" or "breaking window" or any other suitable actions may be defined in an action set which defines the actions that the improved TAL mechanisms of the illustrative embodiments are attempting to detect, label, and localize. The action set may be denoted $\mathcal{A} = \{a_i | a_i = (y_i, b_i)\}_{i=1}^{N}$, where $y_i$ is the category label of the i-th action instance, and $b_i = (s_i, e_i)$ is the temporal boundary box (or simply "boundary box") composed of the start time $s_i$ and the end time $e_i$, corresponding to timestamps of frames of the input video data V.

The action set may be a predefined set of actions set forth in a data structure with which the TAL mechanisms are configured or may be more dynamic, such as specified by a user via a GUI, a search or query mechanism, or by another computing system through automated processes and interactions between the other computing system and the TAL mechanisms of the illustrative embodiments based on a task that is being performed. For example, a user may use a video search engine to find all instances of a specified type of action or actions, e.g., in a security AI application, the user may wish to find segments of video where a person has entered/exited a particular door in a facility. The amount of possible actions that may be defined in the action set is voluminous and cannot be all set forth herein, but those of ordinary skill in the art in view of the present description will recognize that any number and any type of actions that can be captured in video input data are considered to be within the spirit and scope of the present invention. Moreover, the mechanisms through which the actions are specified in the action set may be varied depending on the desired implementation of the computer vision system and the illustrative embodiments are intended to encompass any such mechanism for specifying one or more actions of interest for use by the improved computing tool and improved computing tool operations of the present invention and are not limited to GUIs, search engines, or the like.

As noted previously, the TAL operation may be considered two tasks or sub-tasks, i.e., localization of action instances of interest and classification. These tasks or sub-tasks are generally independent of one another, being performed separately or subsequently. However, the present invention operates on the observation that mutual task guidance can improved both the localization and classification tasks and improve the overall results generated by the TAL operation. The illustrative embodiments provide a mutual guidance learning computer tool in which the results of one task can provide mutual guidance information for the other task and enhance the results generated.

General Methodology and Scheme

Figure 2:
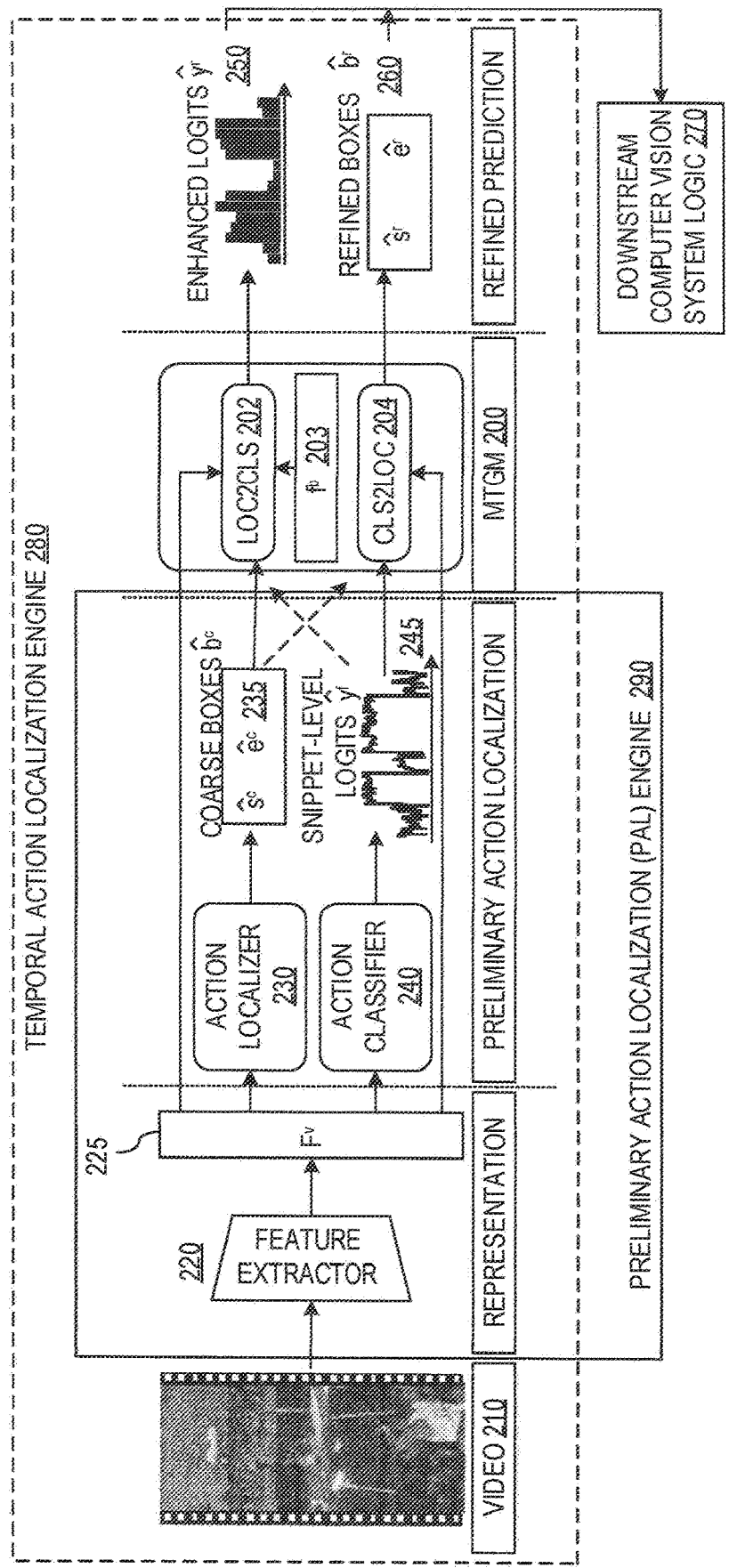
FIG. 2 is an example diagram providing an overview of the primary operational elements and interactions between operational elements of a mutual task guidance module (MTGM) enhanced computer system in accordance with one illustrative embodiment.

FIG. 2 is an example diagram providing an overview of the primary operational elements and interactions between operational elements of a MTGM enhanced computer vision system in accordance with one illustrative embodiment. As mentioned above, the illustrative embodiments provide a Mutual Task Guidance Module (MTGM) 200 that enhances the results generated by an action localizer 230 and an action classifier 240 operation on video data input 210 by providing mutual guidance learning functionalities that are a specific improvement over prior systems and address the specific shortcomings of computer vision systems with regard to temporal action localization (TAL) noted above. The MTGM 200 may be incorporated with existing action localizer 230 and action classifier 240 computer models which provide inputs to the MTGM 200, which in turn boosts the performance of the TAL operations of the computer vision system overall by leveraging the mutual guidance of the action localizer 230 and action classifier 240 computer model operations and results. It should be appreciated that the action localizer 230 and action classifier 240 may be any type of machine learning trained computer models, such as one or more neural networks, deep learning neural networks, convolutional neural networks, or the like. Similarly, references herein to "models" or "computer models" is intended to refer to machine learning trained computer models which may again be one or more neural networks, deep learning neural networks, convolutional neural networks, or the like.

Given an untrimmed video V 210, action localization may be performed in three primary stages of operation: (1) visual representation, (2) preliminary (coarse) action localization, and (3) refined action localization with MTGM 200. More specifically, visual features are first extracted from the given video data input V 210 using a feature extractor computer model 220, such as I3D or the like. Features, in the area of machine learning, pattern recognition, and image processing, refers to a set of derived values, generated from processing of the input data, that are intended to be informative and non-redundant for purposes of subsequent learning by computer models and processing by trained computer models. Feature extraction typically involves a process of dimensionality reduction by which an initial set of raw data, e.g., the untrimmed video data input 210, is reduced to a more manageable group of data for processing by the computer models. The reduced set of features, which may be represented as feature vectors, is expected to contain the relevant information from the input data, so that a desired task can be performed by using this reduced representation instead of the complete initial set of data, e.g., untrimmed video data input. The process of feature extraction is generally known in machine learning technology and thus, a more detailed explanation of feature extraction processes is not provided herein.

Having obtained the informative visual features 225 from the untrimmed video data input 210 via a feature extractor 220, an action localizer 230 and action classifier 240 operate on the extracted features 225 to generate coarse localization results 235 and coarse classification results 245. This process is similar to the two-stage localization and classification operation discussed above in that the action localizer 230 and action classifier 240 are computer models that operate separately or subsequently from one another and virtually independent of each other. The separate action localization by an action localizer 230 to generate coarse bounding boxes $\widehat{b^c}$ 235 may be implemented using any known action localizer computer model, and the classification by the action classifier 240 to generate coarse action classifications, or snippet-level logits $\widehat{y^f}$, where the logit is a probability value corresponding to an action classifications in a predefined set of action classifications, and the logits may be represented as a vector of such probability values.

An example of an action localizer 230 that may be utilized includes A2Net which predicts coarse boxes $\widehat{b^c} = \widehat{s^c}, \widehat{e^c}$ ) based on the feature sequence $F^v$, where $\widehat{s^c}$ is the start time of the predicted box and $\widehat{e^c}$ is the end time of the predicted box (the "c" referring to a "coarse" prediction). The action classifier 240 takes the feature sequence $F^v$, where $F^v=\{f_t^v \in \mathbb{R}^F\}_{t=1}^T$ as input, where t is time, T is the length of the output feature sequence $F^v$ comprising a total time T, $x_t$ is the input video frames for one or more snippets of video data input, $f_t^v$ is the feature(s) extracted from $x_t$, and D represents the channel dimensions. The action classifier 240 generates snippet-level class logits $\widehat{y^f}$ from the feature sequence $F^v$. A "snippet" is a set of consecutive frames in video data input, where the video data input may be separated into a plurality of snippets due to storage space limitations, each snippet consisting of consecutive frames from which features are extracted using the feature extractor. The features extracted from all snippets then form a feature sequence. The separate coarse bounding box prediction and coarse action classification operations performed by the action localizer 230 and action classifier 240 may be together referenced as the Preliminary Action Localization (PAL) engine 290 and corresponding PAL operations.

The results of the PAL operations may be provided as input to the Localization to Classification Attention (Loc2Cls) and Classification to Localization Enhancement (Cls2Loc) engines 202, 204 of the MTGM 200. The Loc2Cls engine 202 uses the coarse bounding boxes $\widehat{b^c}$ generated by the action localizer 230 of the PAL mechanisms to guide the corresponding box features $f^b$ 203 (obtained from the extracted features 225, and where each time point in 225 is a box feature 203 used to predict the coarse bounding box 235) to focus on the visual features within $\widehat{b^c}$ and to predict the enhanced classification results, i.e., enhanced logits $\widehat{y^r}$ 250. The Cls2Loc engine 204 operates on the snippet-level classification results $\widehat{y^f}$ predicted by the action classifier 240 of the PAL mechanisms, to provide category semantic information for the localization task and predict refined bounding boxes $\widehat{b^r}$ 260 having refined start and end times. The details of how these engines 202 and 204 operate to generate the enhanced logits 250 and refined bounding box 260 will be described hereafter with reference to FIG. 3.

The enhanced logits 250 and corresponding refined bounding boxes 260 may be stored and/or provided to other downstream computer vision system logic 270 for further processing and/or presentation to human users. For example, in some illustrative embodiments, the classification results are enhanced by computing the average of the enhanced logits and the preliminary classification results, e.g., snippet-level logits 245, and generating a final classification based on the average. The predicted coarse bounding boxes 235 may be refined by predicting the offsets between these preliminary predicted bounding boxes 235 and ground truth bounding boxes during training, and then refined start and end boundaries are computed (such as by using equations 4 and 5 discussed hereafter). The resulting refined bounding boxes and enhanced logits provide more accurate representations of the location and classification of actions of interest in the video data input so that the downstream computer vision system logic 270 may perform more accurate operations based on these refined and enhanced inputs.

Thus, the elements shows in FIG. 2 may be considered to be present in a temporal action localization (TAL) engine 280 of an overall computer vision system or other artificial intelligence (AI) computer system that operates on the enhanced logits 250 and refined bounding boxes 260 generated for actions identified to be present in untrimmed video data inputs. The TAL engine 280, may in turn, be considered to include a combination of the preliminary action localization (PAL) engine 290 and the mutual task guidance module (MTGM) 200. As can be seen from FIG. 2, these elements operate automatically without human intervention and execute specifically within one or more specially configured computing devices that implement the various elements, such as a video data input 210 source computing system or network attached storage, a computing system that is specifically configured to operate as a feature extractor 220, one or more computing systems specifically configured to operate as the PAL engine 280 mechanisms 230-240, one or more computing systems specifically configured to operate as the MTGM 200, and one or more computing systems specifically configured to implement further downstream computer vision system logic 270 and/ or AI computing system mechanisms. Thus, he present invention is specifically directed to the improved computing tool of the MTGM 200 and the MTGM 200 in combination with the other elements, e.g., PAL engine 290 and downstream computer vision system logic 270, of an improved computer vision or AI computing system, and the improved computing operations and functionality provided by the MTGM 200 and the MTGM 200 in combination with the other elements of the improved computer vision or AI computing system.

Figure 3:
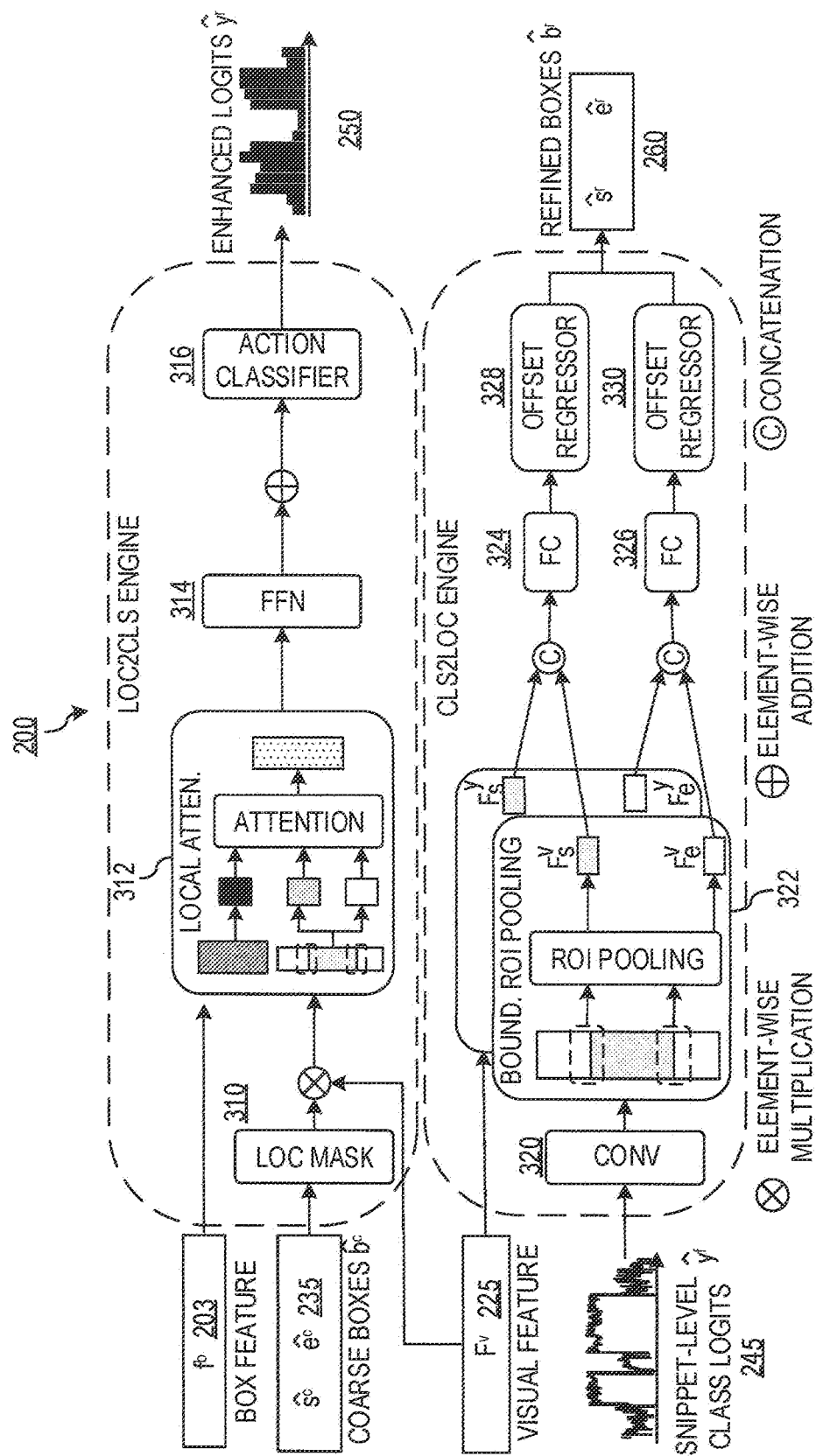
FIG. 3 is an example diagram showing more details of the operations of the Loc2Cls engine and Cls2Loc engine of the MTGM in accordance with one illustrative embodiment.

FIG. 3 is an example diagram showing more details of the operations of the Loc2Cls engine 202 and Cls2Loc engine 204 of the MTGM 200 in accordance with one illustrative embodiment. These engines 202, 204 may be implemented as machine learning trained computer models, such as neural network computer models or the like, that are trained through machine learning processes by machine learning logic (not shown), to generate enhanced logits 250 and refined temporal bounding boxes (or simply boundary boxes) 260, respectively, by performing the operations described herein. The actual machine learning training of these computer models will be described with reference to FIG. 5 hereafter. It should be appreciated that similar element reference numerals in FIG. 3 represent similar elements as shown in FIG. 2 discussed above.

As shown in FIG. 3, the Loc2Cls engine 202 receives as input the coarse bounding boxes $\widehat{b^c}$ 235 from the action localizer 230 and the bounding box features $f^b$ for those coarse bounding boxes 235. The Loc2Cls engine 202 also receives the visual features $F^v$ 225 from the feature extractor 220, which will be multiplied, element-wise, with the results of applying a localization mask 310 to the coarse bounding box input 235. The Cls2Loc engine 204 also receives the visual features $F^v$ 225 as input as well as the snippet-level class logits $\widehat{y^f}$ 245 from the action classifier 240. With these various inputs, the operation of the Loc2Cls engine 202 and Cls2Loc engine 204 will now be explained in more detail using the depiction in FIG. 3, first starting the Cls2Loc engine 204 and then the Loc2Cls engine 202.

Action Classification to Localization

As discussed above, a two-step classification and localization approach to temporal action localization (TAL) operations performs localization without considering the action classification information in the classification results. However, it has been recognized herein that the classification results can provide semantic information of actions and help refine localization outputs. The classification to localization enhancement (Cls2Loc) engine 204 leverages this information to help identify the action content more accurately, resulting in more precise boundary boxes.

As shown in FIG. 3, in addition to using video visual features $F^v$ 225 obtained from the feature extractor 220, the coarse action classification results (logits) $\widehat{y^f}$ 245 are also introduced to provide guidance for enhancing localization outputs. It should be noted that, in some action classifiers, the action classifier may generate coarse action classification results. However, if that is the case, these coarse action classification results that are output by the action localizer may not be used in one or more of the illustrative embodiments, since they are either predicted for a specific proposal or obtained using pyramidal features and thus, the perceptual field of these features is too coarse for fine temporal boundary information capture.

The category semantic information of the classification logits $\widehat{y^f}$ 245 is first encoded with a temporal convolution layer 320 to obtain classification feature $F^y$. This category semantic information is encoded in the classification logits with regard to the category of the action, which the temporal convolution layer 320 is trained and learns to extract from the logits 245. The channel dimension of $F^y$ is the same as the dimension of $F^v$. The neighboring features centered at boundaries are exploited to predict the offsets. Specifically, a temporal region of interest (RoI) pooling operation is used to extract start boundary features $F_s^y$ and $F_s^v$ from $F^y$ and $F^v$ in the neighboring region of $\widehat{s^c}$, where $\widehat{s^c}$ is the start points of the predicted temporal bounding box generated by the action localizer. End boundary features $F_e^y$ and $F_e^v$ are extracted in a similar way as the start boundary features from the neighboring region of $\widehat{e^c}$, where $\widehat{e^c}$ is the end points of the predicted temporal bounding box generated by the action localizer. Formally, the boundary features $F_s^y$ and $F_e^y$ are extracted from $F^y$ by calculating:

$$F_s^y = RoI\left(F^y, \left(\widehat{s^c} - \frac{k}{2}, \widehat{s^c} + \frac{k}{2}\right)\right) \quad (1)$$

$$F_e^y = RoI\left(F^y, \left(\widehat{e^c} - \frac{k}{2}, \widehat{e^c} + \frac{k}{2}\right)\right) \quad (2)$$

$$k = \frac{\widehat{d^c}}{\eta}, \widehat{d^c} = \widehat{e^c} - \widehat{s^c} \quad (3)$$

where k is the size of the neighborhood scope for extracting boundary features, and η controls the scale of the selected neighborhood. The $F_s^v$ and $F_e^v$ can be calculated by the same formulas but with these operations being executed on the visual features $F^v$.

As shown in FIG. 3, the $F_s^y$ and $F_s^v$ are fused by concatenation to form classification enhanced features $F_s^c$, and $F_e^y$ is fused with $F_e^v$ to obtain $F_e^c$. The two offset regressors 328 and 330 take $F_s^c$ and $F_e^c$ as input, respectively, in some cases after the fully connected (FC) layers 324, 326 perform feature transformation, to predict offsets $\widehat{\Delta s^c}$ and $\widehat{\Delta e^c}$ for $\widehat{b^c}$. Each offset regressor 328, 330, in some illustrative embodiments, consists of two fully connected layers, however this is not required and other structures may be used without departing from the spirit and scope of the present invention. The predicted offsets are leveraged to transform the coarse boundary boxes $\widehat{b^c}$ 235 into refined boundary boxes $\widehat{b^r} = \widehat{s^r}, \widehat{e^r}$ ) 260 by computing:

$$\widehat{s^r} \widehat{s^c} + \widehat{\Delta s^c} \quad (4)$$

$$\widehat{e^r} \widehat{e^c} + \widehat{\Delta e^c} \quad (5)$$

Action Localization to Classification

Accurate classification requires the computer model to understand the entire action content and avoid interference by other actions or background content. The localization results can guide the computer model that performs action classification to observe the specific region where the action is located and predict reliable classification results with minimized interference from other actions or background content. The Loc2Cls engine 202 identifies the classifications or categories of actions with more accuracy by using the guidance of localization results to pinpoint regions where the specific actions are present and with little if any other actions or background content.

With reference again to FIG. 3, the coarse predicted boundary box $\widehat{b^c}$ 235 are used to guide the corresponding box feature $f^b$, i.e., the feature used to predict $\widehat{b^c}$, thus mitigating the interference of irrelevant content. Specifically, to alleviate the interference of irrelevant content, $\widehat{b^c}$ is first mapped to a binary Loc Mask $M=\{m_t\}_{t=1}^T$, where the value of $m_t$ is 1 only when t is in the range of $\widehat{s^c}$, $\widehat{e^c}$ ], otherwise it is 0. That is, the Loc Mask 310 identifies the frames that are within the sequence range of the start and end points for the coarsely determined boundary boxes. The Loc Map 310 is expanded to a dimension of T×D and it is multiplied element by element with the snippet-level feature $F^v$ to obtained local feature $F^l$, where only the features within the coarse boundary box have values due to the map.

In order to obtain the information inside $\widehat{b^c}$, rather than performing a temporal max pooling on Fl, which is insufficient because the temporal max pooling is static and loses most information, information from $F^l$ is dynamically aggregated by performing a local attention between $f^b$ and $F^l$. Specifically, $F^l$ is first added with positional encodings to introduce position information from the position encoding of the existing transformer. Then, local attention is performed to aggregate the information of $F^l$ to $f^b$. Formally, the local attention is computed by:

$$F^a = \text{softmax}(\{\alpha_t\}_{t=1}^T)V \quad (6)$$

$$\alpha_t = \frac{(W_q f^b)(F^l)^T}{\sqrt{D}}, \text{ where } V = W_v F^l \quad (7)$$

where $W_q$ and $W_v$ are parameter matrices. In order to eliminate the effect of irrelevant features, the values of $\alpha_t$ are set to negative infinity if $m_t$=0 before calculating the softmax weights. The updated features $F^a$ perceive the internal information of $\widehat{b^c}$. Then, $F^a$ is input into a feed-forward network (FFN) with residual connections 314. FFN 314, in some illustrative embodiments, has two fully connected (FC) layers and two layer normalization (LN) layers. Again, this is one example structure, and other structures may be used as will become apparent to those of ordinary skill in the art in view of the present description. The enhanced features are used to predict more reliable classification results $\widehat{y^r}$ by the action classifier.

Thus, the MTGM 200 provides enhanced logits 250 and refined boxes 260 by applying the Loc2CLs engine 202 to the coarse boundary boxes 235, and corresponding boundary box features, and visual features $F^v$ 225, and applying the Cls2Loc engine 204 to the visual features $F^v$ 225 and snippet level class logits 245. These engines 202 and 204 are machine learning trained computer models that perform the specific operations set forth above to provide the enhanced logits 250 which are based on features of boundary boxes that minimize interference, and specific operations set forth above to provide refined boundary boxes based on classification features which are used to refine the ranges of boundary boxes for actions of interest.

Learning Objectives and Integration With Computer Vision Systems

It should be appreciated that while the MTGM can be incorporated with existing action localizer mechanisms, such as A2Net or the like, as noted above, the MTGM leverages the mutual guidance of two tasks or subtasks to refine the results of each other. The coarse results generated by the action localizer 230 in the preliminary action localization (PAL) engine 290 are used in combination with an action classifier 240 that predicts snippet-level classification results. The MTGM 200 predicts enhanced classification logits and offsets based on these PAL engine 290 results. The MFGM 200 uses machine learning training to train the various machine learning computer models of the MTGM 200 and the action localizer 230 and action classifier 240 of the PAL engine 290 using specific loss functions according to one or more illustrative embodiments. The machine learning training seeks to minimize these loss functions through the training operation.

For example, in one illustrative embodiment, to train the action classifier 240 in the preliminary action localization (PAL) mechanisms, e.g., action classifier 240 in FIG. 2, the following loss function is defined and used to perform training through minimization of the loss according to this loss function:

$$\mathcal{L}_{cls}^f = \mathcal{L}_{ce}(y, \widehat{y^f})  \quad (8)$$

where $\mathcal{L}_{ce}$ is the standard cross-entropy loss, and y is the ground truth classification. Given the enhanced classification logits $\hat{y}^r$, the following loss function is used to train the action classifier in the Loc2Cls engine 202:

$$\mathcal{L}_{cls}^r \mathcal{L}_{ce}(y, \widehat{y^r}) \quad (9)$$

As for the offset regressors 328, 330 in the Cls2Loc engine 204, the ground truth is first calculated by computing:

$$\Delta s^c = s - \widehat{s^c} \quad (10)$$

$$\Delta e^c = e - \widehat{e^c} \quad (11)$$

where s and e are the ground truth of the start time and end time, respectively. Then the loss function for offset regressors 328, 330 is defined as follows:

$$\mathcal{L}_{loc}^r = \mathcal{L}_{L1}(\Delta s^c, \Delta \widehat{s^c}) + \mathcal{L}_{L1}(\Delta e^c, \Delta \widehat{e^c}) \quad (12)$$

where $\mathcal{L}_{L1}$ denotes the L1 loss. The whole computer model, i.e., the combination of the PAL portion, e.g., 220-240 and the MTGM portion 200 of the computer model, is trained in an end-to-end form, meaning that all parameters are learnable and not fixed when the computer model is trained (as opposed to a "non-end-to-end" form where some of the parameters are fixed when training), using the following loss function:

$$\mathcal{L} = \mathcal{L}_0 + \lambda_c(\mathcal{L}_{cls}^f + \mathcal{L}_{cls}^r) + \lambda_l \mathcal{L}_{loc}^r \quad (13)$$

where $\mathcal{L}_0$ is the loss function of action localizer methods to train the action localizer, e.g., objective of A2Net, $\lambda_c$ and $\lambda_l$ are hyperparameters to trade-off classification and localization losses, and may be set according to a desired implementation. The loss function shown in equation 13 may be used as part of a machine learning training operation on training datasets, e.g., training video data input and corresponding ground truth information specifying boundary boxes and corresponding action classifications or categories, to train the various machine learning computer models, e.g., the Cls2Loc and Loc2Cls engines, the action localizer and action classifier in the PAL mechanisms, and the like, so as to minimize the loss $\mathcal{L}$ until an acceptable level of loss is achieved or a predetermined number of epochs of training have occurred. Thereafter, after the training of the MTGM enhanced TAL mechanisms has been performed, new untrimmed video data input may be received and processed in accordance with a defined set of actions of interest so as to identify the boundary boxes and corresponding action classifications for actions present in the video data input.

Figure 4:
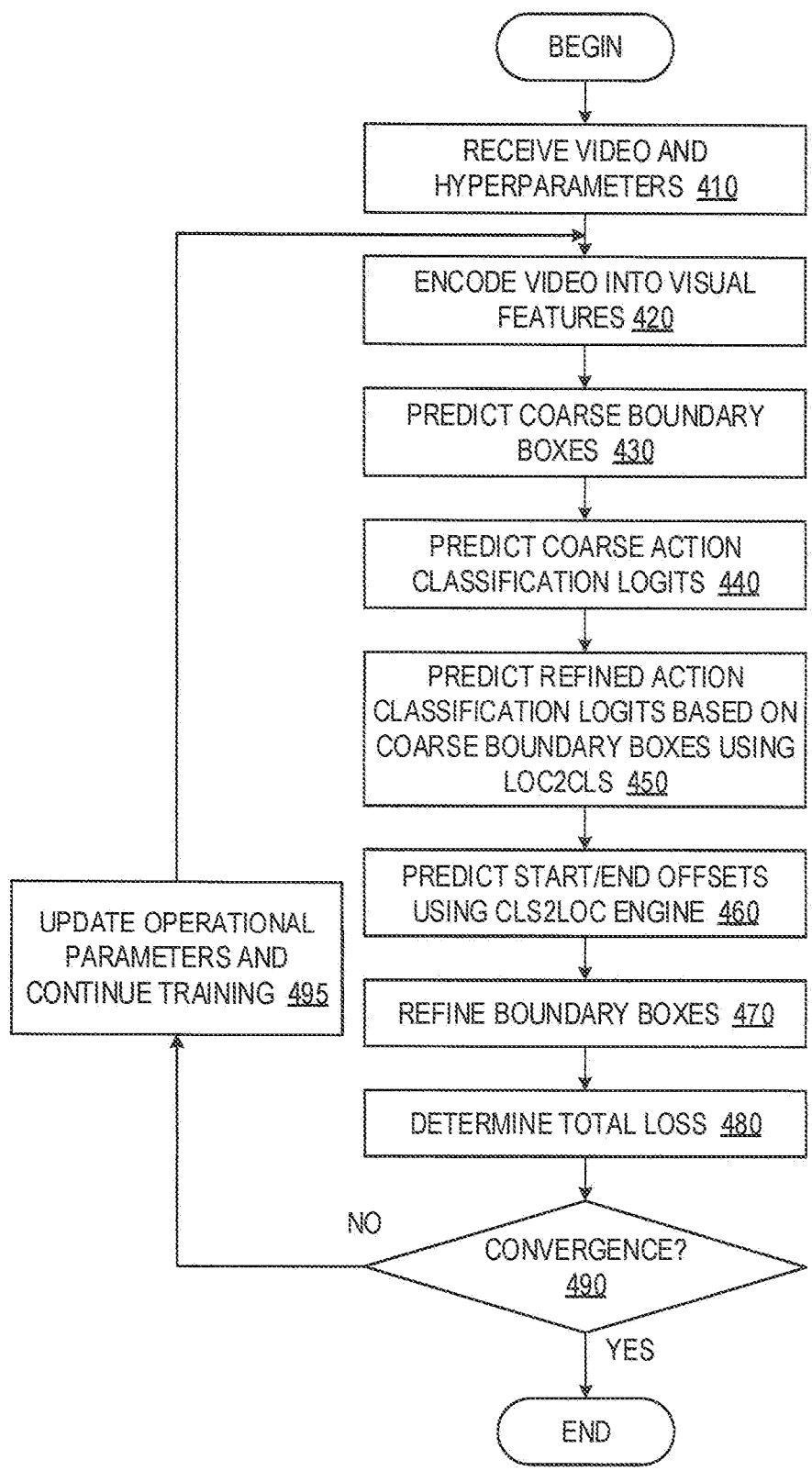
FIG. 4 is a flowchart outlining an example operation of a machine learning process for training a MTGM in accordance with one illustrative embodiment.
Figure 5:
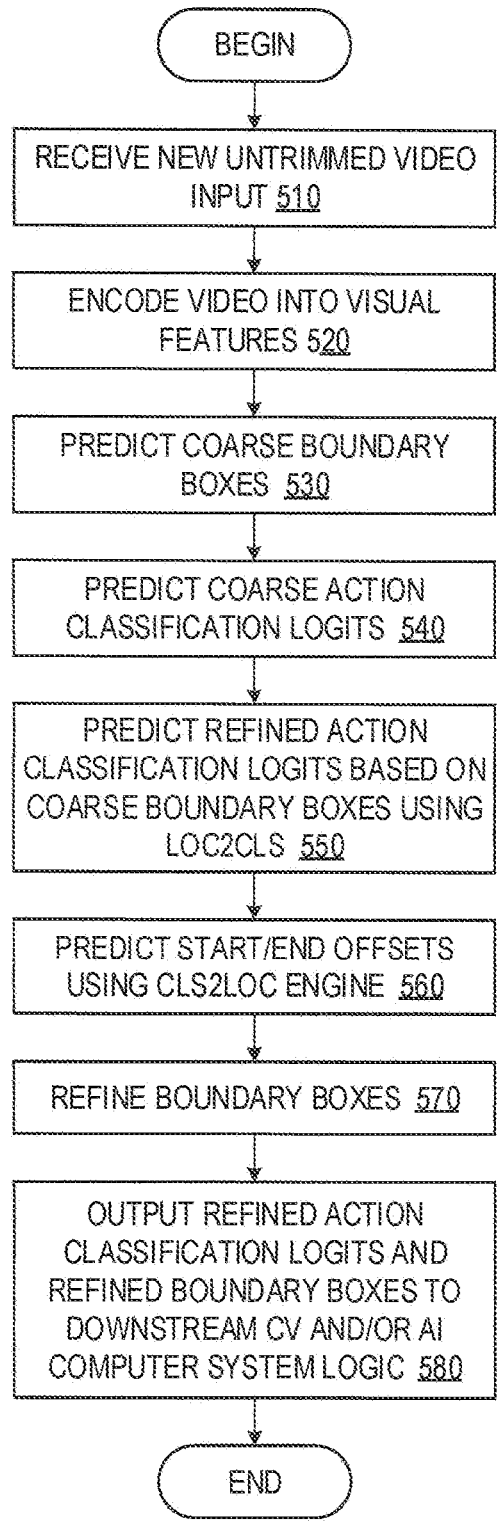
FIG. 5 is a flowchart outlining an example operation of a MTGM enhanced temporal action localization operation in accordance with one illustrative embodiment.

FIGS. 4-5 present flowcharts outlining example operations of elements of the present invention with regard to one or more illustrative embodiments. It should be appreciated that the operations outlined in FIGS. 4-5 are specifically performed automatically by an improved computer tool of the illustrative embodiments and are not intended to be, and cannot practically be, performed by human beings either as mental processes or by organizing human activity. To the contrary, while human beings may, in some cases, initiate the performance of the operations set forth in FIGS. 4-5, and may, in some cases, make use of the results generated as a consequence of the operations set forth in FIGS. 4-5, the operations in FIGS. 4-5 themselves are specifically performed by the improved computing tool in an automated manner.

The MTGM enhanced mechanisms of the illustrative embodiments provide improved action classification and boundary box identification, leading to improved temporal action localization for computer vision system operations. For example, with reference again to FIGS. 1A and 1B, element 150 shows the localization result with classification guidance achieved by the mechanisms of the illustrative embodiments, and element 195 shows the classification results with localization guidance achieved by the mechanisms of the illustrative embodiments. As can be seen in FIG. 1A, the localization achieves a more accurate boundary box prediction compared to the two-stage approach, i.e., element 150 in FIG. 1A, and more accurately reflects the ground truth 120. Similarly, as can be seen in FIG. 1B, the classification achieves a more accurate classification over the entire boundary box and correctly identifies the depicted action to be a "pole vault" rather than a "javelin throw" and "pole vault" as in element 180. This more closely and accurately reflects the ground truth 170.

FIG. 4 is a flowchart outlining an example operation of a machine learning process for training a MTGM in accordance with one illustrative embodiment. As shown in FIG. 4, the machine learning process comprises receiving an untrimmed video data input V and hyperparameters $\lambda_c$, and $\lambda_l$ as inputs (step 410). The video data input V is encoded into visual features $F^v$ using a feature extractor, such as the I3D model or the like (step 420). Preliminary action localization (PAL) mechanisms operate on the extracted visual features to predict coarse boundary boxes using an action localizer (step 430). Preliminary action localization (PAL) mechanisms operate on the extracted visual features to predict the coarse action classification logits using an action classifier (step 440). The mutual task guidance module (MTGM) predicts the refined action classification logits with the coarse boundary boxes using the Loc2Cls engine (step 450). The MTGM predicts start and end offsets to the coarse boundary box start and end locations with the classification logits as guidance using the Cls2Loc engine (step 460). Refined boundary boxes are then generated, such as by using equations 4 and 5 above in some illustrative embodiments (step 470).

The total loss $\mathcal{L}$ is generated, such as by using equation 13 above in some illustrative embodiments (step 480). A determination is made as to whether the training has converged (step 490). If not, the MTGM enhanced TAL model operational parameters are updated using stochastic gradient descent or other machine learning training parameter update functionality (step 495) and the operation returns to step 420. If the training has converged, e.g., the total loss is equal or less than a predetermined level of acceptable loss, or a predetermined number of epochs of training has been reached, then the training operation terminates and the MTGM enhanced TAL model is determined to have been trained through the machine learning training operation.

FIG. 5 is a flowchart outlining an example operation of a MTGM enhanced temporal action localization (TAL) operation in accordance with one illustrative embodiment. The MTGM enhanced TAL operation assumes that the MTGM enhanced TAL computer model has been trained through a machine learning process, such as that shown in FIG. 4, for example, or the like. The trained MTGM enhanced TAL computer model outputs enhanced class logits and refined boundary boxes for actions of interest. The operation for generating such outputs is similar to the training operation shown in FIG. 4 but is executed during runtime on new untrimmed video data input to generate the enhanced logits and refined predicted boundary boxes for specified actions of interest without having to perform training of the models.

As shown in FIG. 5, the operation starts by receiving an untrimmed video data input V as input (step 510). It is assumed that the hyperparameters and operational parameters for the MTGM enhanced TAL computer model have already been set in the configuration of the computer model through the machine learning training operations. The video data input V is encoded into visual features r using a feature extractor, such as the I3D model or the like (step 520). Preliminary action localization (PAL) mechanisms operate on the extracted visual features to predict coarse boundary boxes using an action localizer (step 530). Preliminary action localization (PAL) mechanisms operate on the extracted visual features to predict the action classification logits using an action classifier (step 540). The mutual task guidance module (MTGM) predicts the refined action classification logits with the coarse boundary boxes using the Loc2Cls engine (step 550). The MTGM predicts start and end offsets to the coarse boundary box start and end locations with the classification logits as guidance using the Cls2Loc engine (step 560). Refined boundary boxes are then generated, such as by using equations 4 and 5 above in some illustrative embodiments (step 570). The refined action classification logits and the refined boundary boxes are then output to downstream computer vision system logic and/or AI computer system logic for further processing of the video data input (step 580). The operation then terminates.

Thus, the illustrative embodiments provide an improved computing tool and improved computing tool operations to enhance the action localization and action classification of computer vision systems by using mutual enhancement of localization and classification. The illustrative embodiments provide increased accuracy in the identification of the temporal boundary boxes associated with actions of interest and provides increase accuracy in action classification. This in turn improves the operation of downstream computer vision and AI system operations as more accurate action classification logits and more accurate temporal ranges of corresponding actions may be used to perform these downstream operations.

Figure 6:
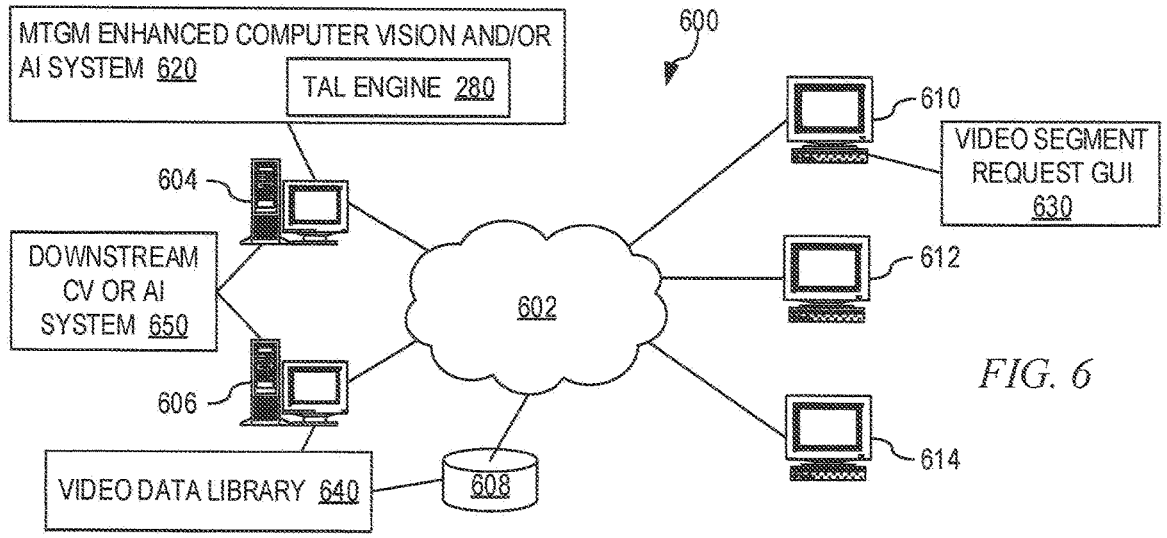
FIG. 6 is an example diagram of a distributed data processing system in which aspects of the illustrative embodiments may be implemented.
Figure 7:
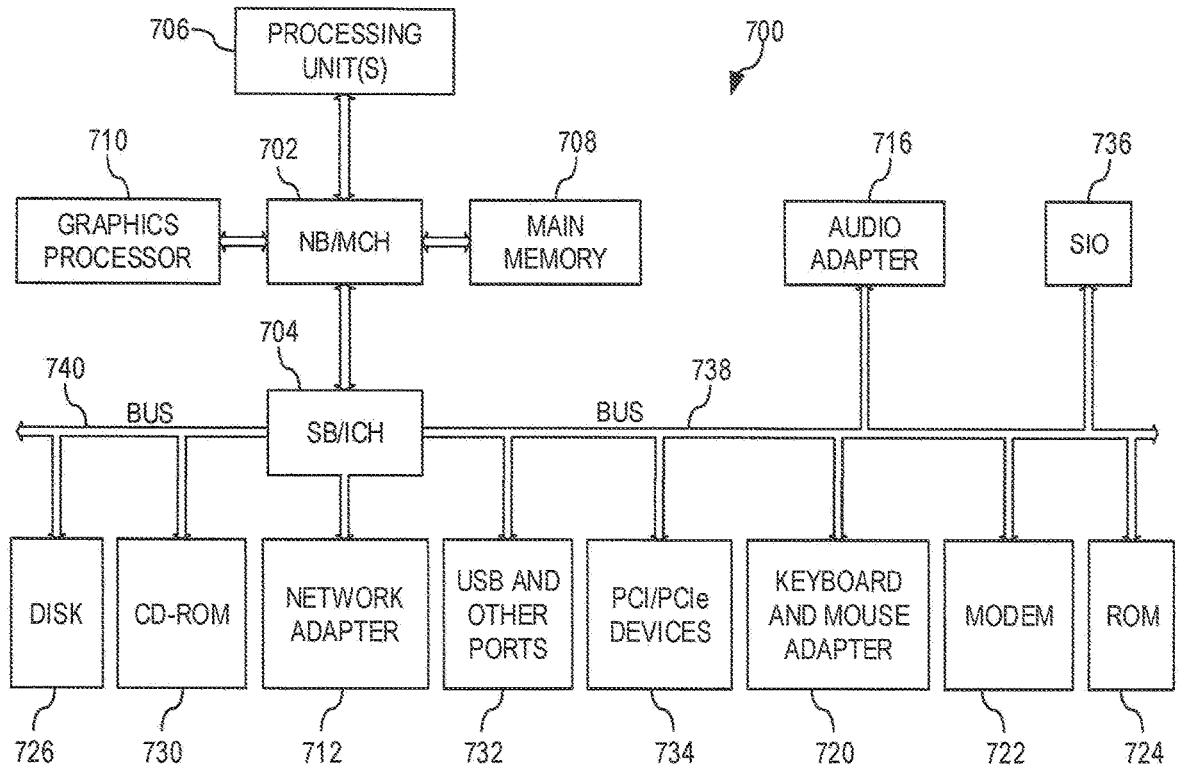
FIG. 7 is an example block diagram of a computing device in which aspects of the illustrative embodiments may be implemented.

The illustrative embodiments may be utilized in many different types of data processing environments. In order to provide a context for the description of the specific elements and functionality of the illustrative embodiments, FIGS. 6 and 7 are provided hereafter as example environments in which aspects of the illustrative embodiments may be implemented. It should be appreciated that FIGS. 6 and 7 are only examples and are not intended to assert or imply any limitation with regard to the environments in which aspects or embodiments of the present invention may be implemented. Many modifications to the depicted environments may be made without departing from the spirit and scope of the present invention.

The present invention may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein. Whether recited as a system, method, of computer program product, it should be appreciated that the illustrative embodiments described herein are specifically directed to an improved computing tool and the methodology implemented by this improved computing tool. In particular, the improved computing tool of the illustrative embodiments specifically provides a mutual task guidance module (MTGM) enhanced computer vision system, specifically with regard to performing temporal action localization (TAL) operations for additional computer vision and artificial intelligence (AI) operations. The improved computing tool implements mechanism and functionality, such as the MTGM mechanisms and functionality described previously, which cannot be practically performed by human beings either outside of, or with the assistance of, a technical environment, such as a mental process or the like. The improved computing tool provides a practical application of the methodology at least in that the improved computing tool is able to generate improved accuracy action classifications and temporal boundary box identification in untrimmed video data input when performing computer vision system operations and/or artificial intelligence (AI) computer operations.

FIG. 6 depicts a pictorial representation of an example distributed data processing system in which aspects of the illustrative embodiments may be implemented. Distributed data processing system 600 may include a network of computers in which aspects of the illustrative embodiments may be implemented. The distributed data processing system 600 contains at least one network 602, which is the medium used to provide communication links between various devices and computers connected together within distributed data processing system 600. The network 602 may include connections, such as wire, wireless communication links, or fiber optic cables.

In the depicted example, server 604 and server 606 are connected to network 602 along with storage unit 608. In addition, clients 610, 612, and 614 are also connected to network 602. These clients 610, 612, and 614 may be, for example, personal computers, network computers, or the like. In the depicted example, server 604 provides data, such as boot files, operating system images, and applications to the clients 610, 612, and 614. Clients 610, 612, and 614 are clients to server 604 in the depicted example. Distributed data processing system 600 may include additional servers, clients, and other devices not shown.

In the depicted example, distributed data processing system 600 is the Internet with network 602 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 600 may also be implemented to include a number of different types of networks, such as for example, an intranet, a local area network (LAN), a wide area network (WAN), or the like. As stated above, FIG. 6 is intended as an example, not as an architectural limitation for different embodiments of the present invention, and therefore, the particular elements shown in FIG. 6 should not be considered limiting with regard to the environments in which the illustrative embodiments of the present invention may be implemented.

As shown in FIG. 6, one or more of the computing devices, e.g., server 604, may be specifically configured to implement a MTGM enhanced computer vision and/or AI computer system. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 604, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described herein, the implementation of the mechanisms of the illustrative embodiments improves the functionality of the computing device and provides a useful and concrete result that facilitates improved accuracy in action classification and temporal boundary box identification in untrimmed video data input for performing temporal action localization and corresponding computer vision and/or artificial intelligence operations.

For example, a client computing device, e.g., client 610, may comprise video data storage and/or capture and storage capabilities, such as a digital camera system and corresponding data storage. The client computing device 610 may provide this captured/stored video data as input to the MTGM enhanced computer vision system 620 executing on server 604 to provide improved accuracy temporal action localization for specified actions of interest. For example, a user may, through a graphical user interface 630, submit a request to identify segments of video data in which a specified action is detected to be present, e.g., opening a door, breaking a window, performing a pole vault or javelin throw, or the like. The client computing device 610 may store the video data upon which the TAL operations are to be performed, or may request that the system 620 identify such segments of video from a video data library 640 in which video data is stored, such as may be provided on one or more other server computing devices 606, network attached data storage 608, or the like. In response to the request and retrieval or receipt of the untrimmed video data input, the system 620 may perform the operations described previously to provide improved or enhanced action classification logits and temporal boundary box identification which may be returned to the requestor, such as via the GUI 630, along with the corresponding video data to specify the requested video data segments in which the actions of interest are provided. In some cases, the identification of the action classification logits and temporal boundary box identifications may be provided to other downstream computer vision system logic and/or artificial intelligence computer system logic 650 to perform additional operations on the identified segments of the video data, e.g., further analysis to determine if the actions, patterns of actions, or the like, indicate a recommended response, indicate a potential threat or risk, etc., and corresponding operations may then be performed, e.g., sending an alert notification, initiating communications to authorities, locking down physical locations, or the like. Various operations may be performed depending on the desired implementation based on the enhanced and improved action classification logits and temporal boundary boxes generated by the mechanisms of the MTGM enhanced system.

As noted above, the mechanisms of the illustrative embodiments utilize specifically configured computing devices, or data processing systems, to perform the operations for mutual task guidance module enhanced temporal action localization and corresponding computer vision and/or AI operations. These computing devices, or data processing systems, may comprise various hardware elements which are specifically configured, either through hardware configuration, software configuration, or a combination of hardware and software configuration, to implement one or more of the systems/subsystems described herein. FIG. 7 is a block diagram of just one example data processing system in which aspects of the illustrative embodiments may be implemented. Data processing system 700 is an example of a computer, such as server 604 in FIG. 6, in which computer usable code or instructions implementing the processes and aspects of the illustrative embodiments of the present invention may be located and/or executed so as to achieve the operation, output, and external effects of the illustrative embodiments as described herein.

In the depicted example, data processing system 700 employs a hub architecture including north bridge and memory controller hub (NB/MCH) 702 and south bridge and input/output (I/O) controller hub (SB/ICH) 704. Processing uni 706, main memory 708, and graphics processor 710 are connected to NB/MCH 702. Graphics processor 710 may be connected to NB/MCH 702 through an accelerated graphics port (AGP).

In the depicted example, local area network (LAN) adapter 712 connects to SB/ICH 704. Audio adapter 716, keyboard and mouse adapter 720, modem 722, read only memory (ROM) 724, hard disk drive (HDD) 726, CD-ROM drive 730, universal serial bus (USB) ports and other communication ports 732, and PCI/PCIe devices 734 connect to SB/ICH 704 through bus 738 and bus 740. PCI/PCIe devices may include, for example, Ethernet adapters, add-in cards, and PC cards for notebook computers. PCI uses a card bus controller, while PCIe does not. ROM 724 may be, for example, a flash basic input/output system (BIOS).

HDD 726 and CD-ROM drive 730 connect to SB/ICH 704 through bus 740. HDD 726 and CD-ROM drive 730 may use, for example, an integrated drive electronics (IDE) or serial advanced technology attachment (SATA) interface. Super I/O (SIO) device 736 may be connected to SB/ICH 704.

An operating system runs on processing unit 706. The operating system coordinates and provides control of various components within the data processing system 700 in FIG. 7. As a client, the operating system may be a commercially available operating system such as Microsoft® Windows 11®. An object-oriented programming system, such as the Java™ programming system, may run in conjunction with the operating system and provides calls to the operating system from Java™ programs or applications executing on data processing system 700.

As a server, data processing system 700 may be, for example, an IBM eServer™ System p® computer system, Power™ processor based computer system, or the like, running the Advanced Interactive Executive (AIX®) operating system or the LINUX® operating system. Data processing system 700 may be a symmetric multiprocessor (SMP) system including a plurality of processors in processing unit 706. Alternatively, a single processor system may be employed.

Instructions for the operating system, the object-oriented programming system, and applications or programs are located on storage devices, such as HDD 726, and may be loaded into main memory 708 for execution by processing unit 706. The processes for illustrative embodiments of the present invention may be performed by processing unit 706 using computer usable program code, which may be located in a memory such as, for example, main memory 708, ROM 724, or in one or more peripheral devices 726 and 730, for example.

A bus system, such as bus 738 or bus 740 as shown in FIG. 7, may be comprised of one or more buses. Of course, the bus system may be implemented using any type of communication fabric or architecture that provides for a transfer of data between different components or devices attached to the fabric or architecture. A communication unit, such as modem 722 or network adapter 712 of FIG. 7, may include one or more devices used to transmit and receive data. A memory may be, for example, main memory 708, ROM 724, or a cache such as found in NB/MCH 702 in FIG. 7.

As mentioned above, in some illustrative embodiments the mechanisms of the illustrative embodiments may be implemented as application specific hardware, firmware, or the like, application software stored in a storage device, such as HDD 726 and loaded into memory, such as main memory 708, for executed by one or more hardware processors, such as processing unit 706, or the like. As such, the computing device shown in FIG. 7 becomes specifically configured to implement the mechanisms of the illustrative embodiments and specifically configured to perform the operations and generate the outputs described herein with regard to the MTGM enhanced TAL mechanisms and corresponding computer vision system or AI computer system.

Those of ordinary skill in the art will appreciate that the hardware in FIGS. 6 and 7 may vary depending on the implementation. Other internal hardware or peripheral devices, such as flash memory, equivalent non-volatile memory, or optical disk drives and the like, may be used in addition to or in place of the hardware depicted in FIGS. 6 and 7. Also, the processes of the illustrative embodiments may be applied to a multiprocessor data processing system, other than the SMP system mentioned previously, without departing from the spirit and scope of the present invention.

Moreover, the data processing system 700 may take the form of any of a number of different data processing systems including client computing devices, server computing devices, a tablet computer, laptop computer, telephone or other communication device, a personal digital assistant (PDA), or the like. In some illustrative examples, data processing system 700 may be a portable computing device that is configured with flash memory to provide non-volatile memory for storing operating system files and/or user-generated data, for example. Essentially, data processing system 700 may be any known or later developed data processing system without architectural limitation.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, that performs a computer vision temporal action localization operation on input video data, the method comprising:
receiving a coarse temporal bounding box, having a first start point and a first end point, for an action in the input video data, and a first set of logits, wherein each logit corresponds to a potential classification of the action in the input video data;
executing a first engine on the coarse temporal bounding box to generate a second set of logits;
executing a second engine on the first set of logits to generate a refined temporal bounding box having a second start point and a second end point; and
performing the computer vision temporal action localization operation based on the second set of logits and the refined temporal bounding box to specify a temporal segment of the input video data corresponding to an action represented in the input video data, and a corresponding classification of the action represented in the temporal segment.

2. The method of claim 1, wherein the data processing system is further configured to provide a preliminary action localization (PAL) engine comprising an action localizer computer model and an action classifier computer model, and wherein the coarse temporal bounding box is generated by executing the action localizer computer model on a set of features extracted from the input video data, and the first set of logits are generated at least by executing the action classifier computer model on the set of features extracted from the input video data.

3. The method of claim 2, wherein the first engine uses the localization results of the action localizer computer model to specify a constraint on action classification via a local attention mechanism that reduces interference from irrelevant content.

4. The method of claim 2, wherein the second engine uses semantic information contained in action classifications corresponding to logits in the first set of logits, and the set of features extracted from the input video data, to refine the coarse temporal bounding box to generate the refined temporal bounding box.

5. The method of claim 1, wherein the action is an action of interest specified by at least one of a configuration data structure that configures the data processing system to locate segments of the input video data corresponding to the action of interest, a user input via a graphical user interface specifying the action of interest, a user input into a video search engine specifying an action of interest for searching the input video data for a matching video segment having the action of interest, or another computer system via an interaction between the other computer system and the data processing system to provide a video segment having the action of interest.

6. The method of claim 1, wherein generating the corresponding classification comprises computing an average of the first set of logits and the second set of logits and determining the corresponding classification based on the average.

7. The method of claim 1, wherein the execution of the second engine on the first set of logits to generate the refined temporal bounding box comprises generating, by the second engine, offsets to the first start point and the first end point to generate a second start point and a second end point corresponding to the refined temporal bounding box.

8. The method of claim 2, wherein the action localizer computer model, action classifier computer model, the first engine, and second engine are machine learning computer models trained by executing an end-to-end machine learning training operation on the action localizer computer model, classifier computer model, the first engine, and the second engine.

9. The method of claim 8, wherein the end-to-end machine learning training operation comprises executing the machine learning training operation to minimize a combined loss function based on a combination of a first loss function of the action localizer computer model, a second loss function of the second engine weighted by a first trade-off hyperparameter, and a third loss function of the first engine weighted by a second trade-off hyperparameter.

10. The method of claim 9, wherein the second loss function is calculated as a cross-entropy loss based on the second set of logits and a ground truth classification, and wherein the third loss function is calculated as a function of the L1 loss of offsets corresponding to a second start point and second end point of the at least one refined temporal bounding box and ground truth offsets.

11. A computer program product comprising a computer readable storage medium having a computer readable program stored therein, wherein the computer readable program, when executed on a data processing system, causes the data processing system to perform a computer vision temporal action localization operation on input video data at least by:
receiving a coarse temporal bounding box, having a first start point and a first end point, for an action in the input video data, and a first set of logits, wherein each logit corresponds to a potential classification of the action in the input video data;
executing a first engine on the coarse temporal bounding box to generate a second set of logits;
executing a second engine on the first set of logits to generate a refined temporal bounding box having a second start point and a second end point; and
performing the computer vision temporal action localization operation based on the second set of logits and the refined temporal bounding box to specify a temporal segment of the input video data corresponding to an action represented in the input video data, and a corresponding classification of the action represented in the temporal segment.

12. The computer program product of claim 11, wherein the data processing system is further configured to provide a preliminary action localization (PAL) engine comprising an action localizer computer model and an action classifier computer model, and wherein the coarse temporal bounding box is generated by executing the action localizer computer model on a set of features extracted from the input video data, and the first set of logits are generated at least by executing the action classifier computer model on the set of features extracted from the input video data.

13. The computer program product of claim 12, wherein the first engine uses the localization results of the action localizer computer model to specify a constraint on action classification via a local attention mechanism that reduces interference from irrelevant content.

14. The computer program product of claim 12, wherein the second engine uses semantic information contained in action classifications corresponding to logits in the first set of logits, and the set of features extracted from the input video data, to refine the coarse temporal bounding box to generate the refined temporal bounding box.

15. The computer program product of claim 11, wherein the action is an action of interest specified by at least one of a configuration data structure that configures the data processing system to locate segments of the input video data corresponding to the action of interest, a user input via a graphical user interface specifying the action of interest, a user input into a video search engine specifying an action of interest for searching the input video data for a matching video segment having the action of interest, or another computer system via an interaction between the other computer system and the data processing system to provide a video segment having the action of interest.

16. The computer program product of claim 11, wherein generating the corresponding classification comprises computing an average of the first set of logits and the second set of logits and determining the corresponding classification based on the average.

17. The computer program product of claim 11, wherein the execution of the second engine on the first set of logits to generate the refined temporal bounding box comprises generating, by the second engine, offsets to the first start point and the first end point to generate a second start point and a second end point corresponding to the refined temporal bounding box.

18. The computer program product of claim 12, wherein the action localizer computer model, action classifier computer model, the first engine, and second engine are machine learning computer models trained by executing an end-to-end machine learning training operation on the action localizer computer model, classifier computer model, the first engine, and the second engine.

19. The computer program product of claim 18, wherein the end-to-end machine learning training operation comprises executing the machine learning training operation to minimize a combined loss function based on a combination of a first loss function of the action localizer computer model, a second loss function of the second engine weighted by a first trade-off hyperparameter, and a third loss function of the first engine weighted by a second trade-off hyperparameter.

20. A data processing system comprising:
at least one processor; and
at least one memory coupled to the at least one processor, wherein the at least one memory comprises instructions which, when executed by the at least one processor, cause the at least one processor to:
receive a coarse temporal bounding box, having a first start point and a first end point, for an action in the input video data, and a first set of logits, wherein each logit corresponds to a potential classification of the action in the input video data;
execute a first engine on the coarse temporal bounding box to generate a second set of logits;
execute a second engine on the first set of logits to generate a refined temporal bounding box having a second start point and a second end point; and
perform the computer vision temporal action localization operation based on the second set of logits and the refined temporal bounding box to specify a temporal segment of the input video data corresponding to an action represented in the input video data, and a corresponding classification of the action represented in the temporal segment.

\* \* \* \* \*